US008698718B2

(12) United States Patent
Gass et al.

(10) Patent No.: US 8,698,718 B2
(45) Date of Patent: *Apr. 15, 2014

(54) DISPLAY DEVICE AND LIQUID CRYSTAL DISPLAY PANEL

(75) Inventors: Paul Antony Gass, Oxford (GB); Diana Ulrich Kean, Oxfordshire (GB); Nathan Smith, Oxfordshire (GB); Thomas Mathew Wynne-Powell, Oxfordshire (GB); Allan Evans, Oxfordshire (GB); Benjamin John Broughton, Pembrokeshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/240,068

(22) Filed: Sep. 22, 2011

(65) Prior Publication Data

US 2012/0056914 A1   Mar. 8, 2012

Related U.S. Application Data

(62) Division of application No. 12/879,096, filed on Sep. 10, 2010, now Pat. No. 8,144,093, which is a division of application No. 11/428,883, filed on Jul. 6, 2006, now Pat. No. 7,965,268.

(30) Foreign Application Priority Data

Jul. 8, 2005   (GB) .................................... 0513968.8
Jul. 8, 2005   (GB) .................................... 0513971.2

(51) Int. Cl.
G09G 3/36   (2006.01)

(52) U.S. Cl.
USPC ........................................................... 345/87

(58) Field of Classification Search
USPC ................................ 345/38, 87–104; 349/142
See application file for complete search history.

(56) References Cited

U.S. PATENT DOCUMENTS

RE27,617 E   4/1973   Olsen
4,764,410 A   8/1988   Grzywinski
(Continued)

FOREIGN PATENT DOCUMENTS

CN   1487495   4/2004
CN   1534338   10/2004
(Continued)

OTHER PUBLICATIONS

Office Action for related U.S. Appl. No. 12/879,096, filed Sep. 10, 2010.
(Continued)

Primary Examiner — Michael Pervan
(74) Attorney, Agent, or Firm — Renner, Otto, Boisselle & Sklar, LLP

(57) ABSTRACT

A display device is provided that comprises a liquid crystal display panel for displaying an image by spatial light modulation, and circuitry for switching liquid crystal in the panel between having a first configuration in a first mode to cause an image displayed using the panel to be discernible from a wide range of viewing angles, and having a second configuration in a second mode to cause an image displayed using the panel to be discernible substantially only from within a narrow range of viewing angles. Several types of display panel to achieve such in-panel switching between public and private viewing modes are disclosed.

22 Claims, 23 Drawing Sheets

(56) References Cited

U.S. PATENT DOCUMENTS

| | | | |
|---|---|---|---|
| 4,766,023 | A | 8/1988 | Caddock, Jr. |
| 5,109,219 | A | 4/1992 | Kastan et al. |
| 5,147,716 | A | 9/1992 | Bellus |
| 5,528,319 | A | 6/1996 | Austin |
| 5,825,436 | A | 10/1998 | Knight |
| 5,831,698 | A | 11/1998 | Depp et al. |
| 5,844,640 | A | 12/1998 | Adachi |
| 5,877,829 | A | 3/1999 | Okamoto et al. |
| 5,936,596 | A | 8/1999 | Yoshida et al. |
| 6,211,930 | B1 | 4/2001 | Sautter et al. |
| 6,369,949 | B1 | 4/2002 | Conley |
| 6,445,434 | B2 | 9/2002 | Takato et al. |
| 6,549,255 | B2 | 4/2003 | Stebler et al. |
| 6,552,850 | B1 | 4/2003 | Dudasik |
| 6,870,643 | B2 | 3/2005 | Thompson et al. |
| 7,471,367 | B2 * | 12/2008 | Son ............... 349/145 |
| 2001/0015782 | A1 | 8/2001 | Takato et al. |
| 2002/0158967 | A1 | 10/2002 | Janick et al. |
| 2002/0180922 | A1 | 12/2002 | Takato et al. |
| 2003/0146893 | A1 | 8/2003 | Sawabe |
| 2004/0061711 | A1 | 4/2004 | Kurumisawa et al. |
| 2004/0100604 | A1 | 5/2004 | Takato et al. |
| 2004/0125298 | A1 | 7/2004 | Oh et al. |
| 2004/0207594 | A1 | 10/2004 | Kubo |
| 2004/0252258 | A1 | 12/2004 | Matsushima |
| 2005/0063029 | A1 | 3/2005 | Khazova et al. |
| 2005/0243265 | A1 | 11/2005 | Winlow et al. |
| 2006/0126156 | A1 | 6/2006 | Evans et al. |
| 2006/0267905 | A1 | 11/2006 | Nishino et al. |
| 2007/0040780 | A1 | 2/2007 | Gass et al. |

FOREIGN PATENT DOCUMENTS

| | | |
|---|---|---|
| CN | 1621928 | 6/2005 |
| EP | 0 802 684 | 10/1997 |
| GB | 2 405 544 | 3/2005 |
| GB | 2 410 339 | 7/2005 |
| GB | 2 418 518 | 3/2006 |
| JP | 08-136909 A | 5/1996 |
| JP | 9-6289 A | 1/1997 |
| JP | 9-105958 A | 4/1997 |
| JP | 9-230377 | 9/1997 |
| JP | 10-197844 A | 7/1998 |
| JP | 10-319373 A | 12/1998 |
| JP | 11-7045 A | 1/1999 |
| JP | 11-174489 A | 7/1999 |
| JP | 2000-111895 | 4/2000 |
| JP | 2001-264768 | 9/2001 |
| JP | 2001-344050 A | 12/2001 |
| JP | 3405972 | 5/2003 |
| JP | 2003-295160 A | 10/2003 |
| JP | 2004-133334 | 4/2004 |
| JP | 2004-233527 A | 8/2004 |
| JP | 2004-302186 A | 10/2004 |
| JP | 2004-318112 A | 11/2004 |
| JP | 2003-233074 | 1/2005 |
| JP | 3607272 | 1/2005 |
| JP | 2005-107306 A | 4/2005 |
| JP | 2005-181588 A | 7/2005 |
| KR | 10-2004-0095736 | 11/2004 |
| WO | 97/14990 | 4/1997 |
| WO | 03/015424 | 2/2003 |
| WO | 2005/071449 | 8/2005 |

OTHER PUBLICATIONS

Office Action for related U.S. Appl. No. 13/397,806 dated Jun. 5, 2012.

UK Search Report for corresponding application No. 0513971.2 dated Oct. 14, 2005.

UK Search Report for corresponding application No. 0513968.8 dated Sep. 21, 2005.

M. Dogruel; "A Method for Concealment of Displayed Data"; Displays; vol. 24; Oct. 2003; pp. 97-102.

J. Kim et al.; "Surface Alignment Bistability of Nematic Liquid Crystals by Orientationally Frustrated Surface Patterns"; Applied Physics Letters; vol. 78, No. 20; May 14, 2001; pp. 3055-3057.

S. Kitson et al.; "Controllable Alignment of Nematic Liquid Crystals Around Microscopic Posts: Stabilization of Multiple States"; Applied Physics Letters; vol. 80, No. 19; May 13, 2002; pp. 3635-3637.

* cited by examiner

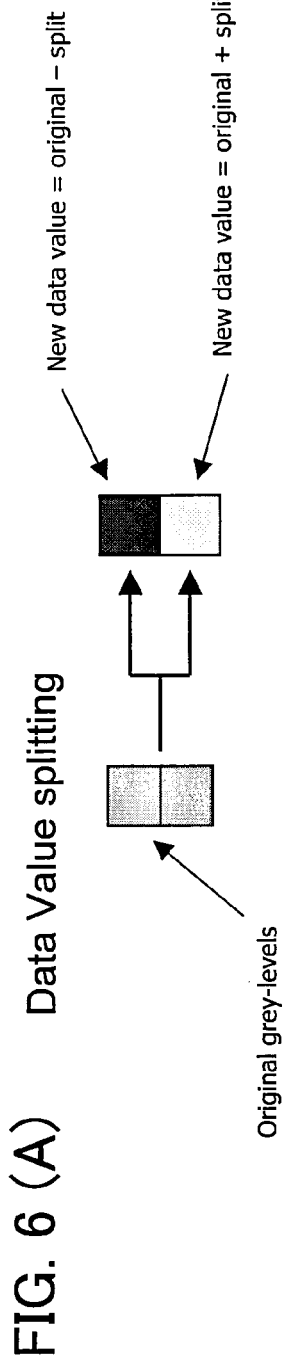
FIG. 6 (A)   Data Value splitting
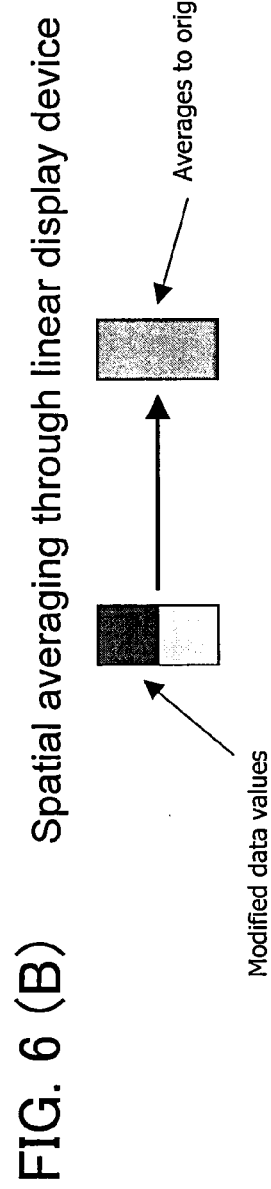
FIG. 6 (B)   Spatial averaging through linear display device
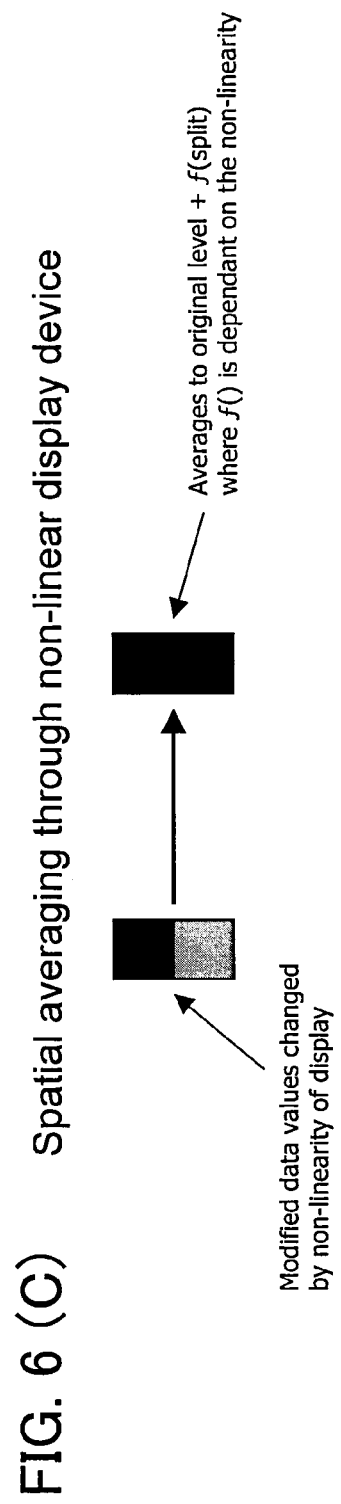
FIG. 6 (C)   Spatial averaging through non-linear display device Alternate lines Alternate pixels Alternate sub-pixels

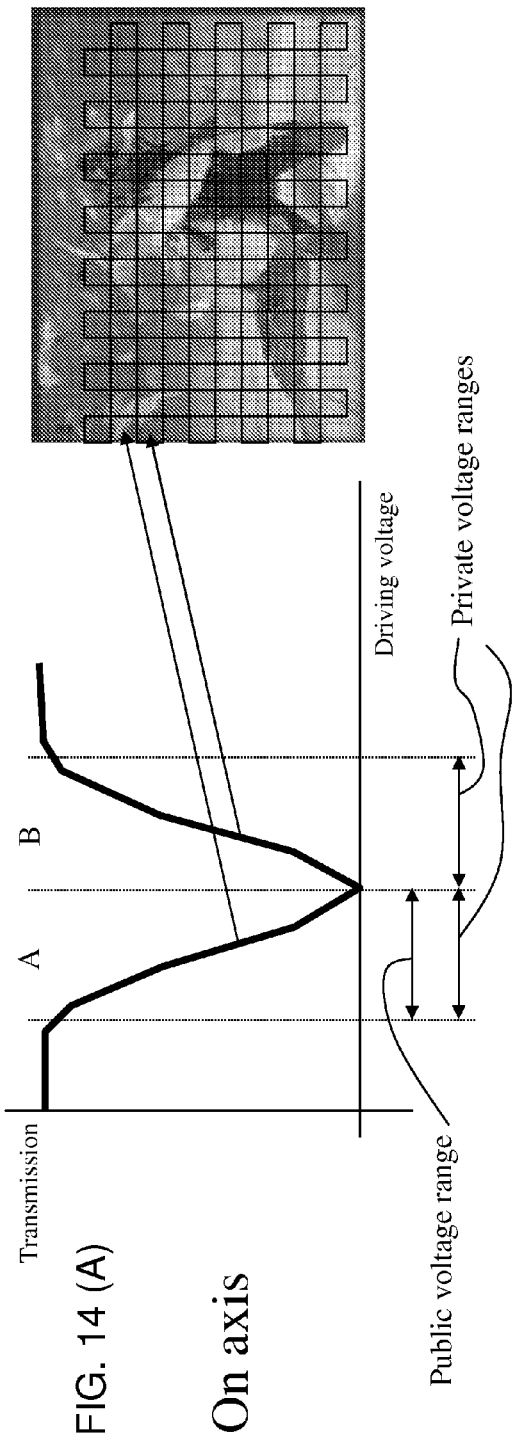
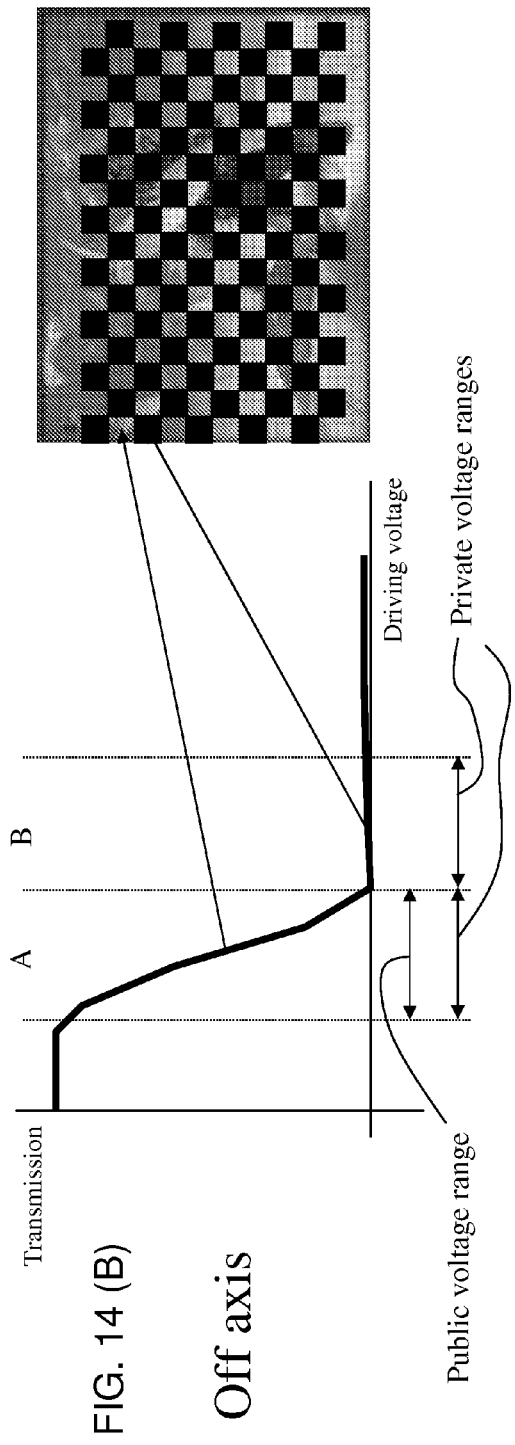
FIG. 14 (A) On axis
FIG. 14 (B) Off axis

FIG. 15

| Polariser: azimuth at 45° |
|---|
| Retarder: 2.5μm thick, 0.132 birefringence uniform 45° tilt, azimuth at 0° |
| Retarder: 2.5μm thick, 0.132 birefringence uniform -45° tilt, azimuth at 0° |
| Liquid Crystal Layer: 6.2 μm thick, 0.132 birefringence 2° antiparallel pretilt, azimuth at 90° |
| Polariser: azimuth at -45° |

Low voltage range

High voltage range

FIG. 18 (A)
Public Mode
CPA orientation
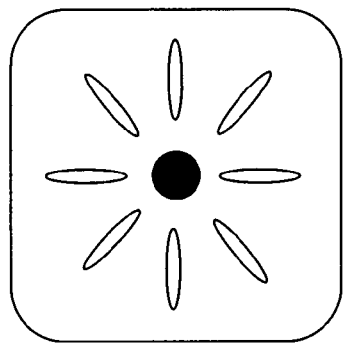
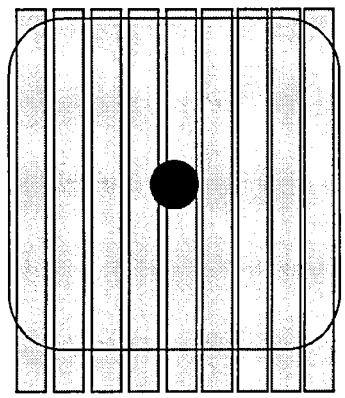
In-plane
electrodes at
uniform voltage
FIG. 18 (B)
Private Mode
Two orientations
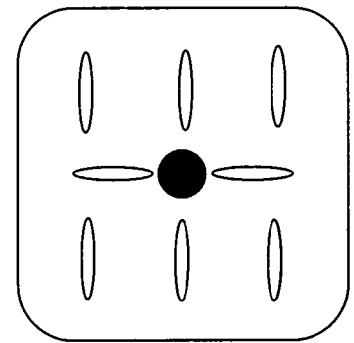
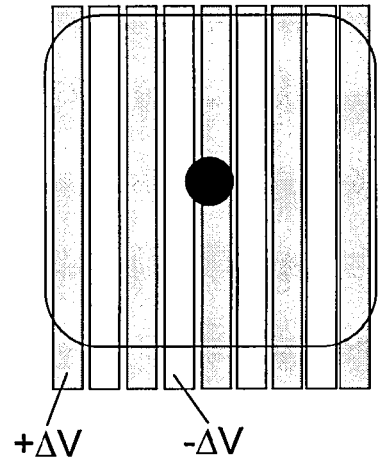
+ΔV    −ΔV Public Mode
CPA orientation Private Mode
"HAN like"
orientations Side View Plan View Supplementary electrodes: only connected to main electrode in defect state Light aperture    transmitting Narrow viewing mode    Wide viewing mode Common Ground Bias Applied

DISPLAY DEVICE AND LIQUID CRYSTAL DISPLAY PANEL

This Nonprovisional application is a divisional of Nonprovisional patent application Ser. No. 12/879,096 filed on Sep. 10, 2010, which is a divisional of Nonprovisional patent application Ser. No. 11/428,883 filed on Jul. 6, 2006, now U.S. Pat. No. 7,965,268, which claims priority under 35 U.S.C. §119(a) on Patent Applications No. 0513971.2 and No. 1513968.8 filed in U.K. on Jul. 8, 2005, the entire contents of which are hereby incorporated by reference.

FIELD OF THE INVENTION

The present invention relates to a display device and a liquid crystal display panel for use in a display device.

BACKGROUND OF THE INVENTION

Electronic display devices, such as monitors used with computers and screens built in to telephones and portable information devices, are usually designed to have a viewing angle as wide as possible, so that they can be read from as many viewing positions as possible.

However, there are some situations where it is useful to have a display that is visible from only a narrow range of angles. For example, where a person is reading a confidential or private document on the display of a mobile device in a crowded place, he would wish to minimise the risk of others around him also having sight of the document on the display.

It is therefore useful to have a display device that is switchable between two modes of operation. In a 'public' mode, the display device would have a wide viewing angle for general use. In a 'private' mode, the display device would have a narrow viewing angle, so that private information could be read in a public place.

For example, when certain secure web pages are accessed (e.g. bank site web pages), or when a certain PIN (personal identification number) is input to the keyboard (e.g. bank account PIN), the display could automatically go into the privacy mode. In the private mode, an indicator or icon could be shown on the screen to indicate that the private mode is active.

This concept can be applied to many other types of devices where a user may which to view confidential information, but cannot control who else may be watching. Examples are mobile phones, Personal Digital Assistants (PDAs), laptop PCs, desktop monitors, Automatic Teller Machines (ATMs) and Electronic Point of Sale (EPoS) equipment.

A number of devices are known which restrict the range of angles or positions from which a display can be viewed.

U.S. Pat. No. 6,552,850 describes a method for the display of private information on a cash dispensing machine. Light emitted by the machine's display has a fixed polarisation state. The machine and its user are surrounded by a large screen of sheet polariser that absorbs light of that polarisation state but transmits the orthogonal state. Passers-by can see the user and the machine but cannot see information displayed on the screen.

One method for controlling the direction of light is the use of a "louvred" film. Such a film consists of alternating transparent and opaque layers in an arrangement similar to a Venetian blind. These layers may be perpendicular to the surface of the film or at some other angle. Like a Venetian blind, it allows light to pass through it when the light is travelling in a direction nearly parallel to the plane of the layers, but absorbs light travelling at large angles to the plane of the layers. Methods for the production of such films are described in U.S. RE 27,617, U.S. Pat. Nos. 4,766,023 and 4,764,410.

Other methods exist for making films with similar properties to the louvred film. These are described, for example, in U.S. Pat. Nos. 5,147,716 and 5,528,319.

The techniques described above may be used to restrict the range of angles from which a display can be viewed; in other words, they can be used to make a display 'private'. However none of them gives a method by which the privacy function can easily be switched off to allow viewing from a wide range of angles.

Several methods are known for providing a display that can be switched between a public mode (with a wide viewing angle) and a private mode (with a narrow viewing angle).

US 2002/0158967 describes the use of a light control film mounted on a display so that the light control film can be moved over the front of the display to give a private mode, or mechanically retracted into a holder behind or beside the display to give a public mode. This method has the disadvantages that it requires moving parts that may fail or be damaged, and it adds significant bulk to the display.

One method for switching from public to private mode with no moving parts is to mount a light control film behind the display panel, and to place a diffuser that can be electronically switched on and off between the light control film and the panel. When the diffuser is inactive, the light control film restricts the range of viewing angles and the display is in the private mode. When the diffuser is switched on, it causes light travelling at a wide range of angles to pass through the panel and the display is in the public mode. It is also possible to mount the light control film in front of the panel and place the switchable diffuser in front of the light control film to achieve the same effect.

Switchable privacy devices of this type are described in U.S. Pat. Nos. 5,831,698, 6,211,930 and 5,877,829. They share the disadvantage that the light control film absorbs a significant fraction of the light incident upon it, whether the display is in the public or the private mode. The display is therefore inefficient in its use of light. Since the diffuser spreads light through a wide range of angles in the public mode, these displays are also dimmer in the public mode than in the private mode, unless the backlight is made brighter to compensate.

Another disadvantage relates to the power consumption of such devices. In the public mode of operation, the diffuser is switched off. This would typically mean that a voltage is applied to a switchable polymer-dispersed liquid crystal diffuser. More power is therefore consumed in the public mode than in the private mode. This is a disadvantage for displays that are used for most of the time in the public mode.

Another known method for providing a switchable public/private display is described in U.S. Pat. No. 5,825,436. The light control device disclosed is similar in structure to the louvred film described above. However, each opaque element in the louvred film is replaced by a liquid crystal cell that can be electronically switched from an opaque state to a transparent state. The light control device is placed in front of or behind a display panel. When the cells are opaque, the display is in a private mode; when the cells are transparent, the display is in a public mode.

One disadvantage of this method relates to the difficulty and expense of manufacturing liquid crystal cells with an appropriate shape. Another disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Another method for producing a switchable public/private display device is disclosed in JP 3607272. The disclosed device uses an additional liquid crystal panel, which has patterned liquid crystal alignment. Different aligned segments of the panel modify the viewing characteristics of different areas of the display in different ways, with the result that the whole display panel is fully readable only from a central position.

GB-A-2405544 and JP 2005-078093 describe switchable privacy devices based on louvres, which operate only for one polarisation of light. The louvres are switched on and off either by rotating dyed liquid crystal molecules in the louvre itself or by rotating the plane of polarisation of the incident light using a separate element.

GB-A-2410116 (WO 2005/071449) disclose various backlight arrangements for use in a display device having the ability to switch the viewing angle between public and private modes, for example. Further known systems and techniques in this area are also described therein.

GB-A-2413394 (US 2005/0243265) discloses a switchable privacy device that is constructed by adding one or more extra liquid crystal layers and polarisers to a display panel. The intrinsic viewing angle dependence of these extra elements can be changed by electrically switching the liquid crystal.

US 2003/0146893 discloses a polarisation modifying layer (PML) that is placed behind the exit polariser of a liquid crystal display panel. Some parts of the PML are transparent. Other parts change the polarisation of light passing through them so that pixels viewed through these parts are inverted in colour (bright pixels becoming dark and dark pixels becoming bright). Data sent to pixels directly behind these parts are inverted so that when the display is viewed from a central position, the image appears normally. However, when the display is viewed from a different angle, different pixels are viewed through the retarder elements and the image is corrupted. Off-axis viewers see a confusing image, for example a random dot pattern. The PML may be made from liquid crystal and switched off to give a public mode.

GB-A-2418518 discloses a device in which a guest host (dyed) LC layer with a patterned electrode is added to a standard TFT LC display. The dyed LC layer can be switched between an absorbing (private) and non-absorbing state (public). The dye molecules absorption is dependent upon the incident angle and polarisation of light. For a given polarisation and orientation the absorption of the dye increases with larger viewing angles resulting in low brightness at high angles (narrow mode).

Co-pending British Patent Application No. 0510422.9 discloses the combination of a privacy function and a 3D function provided by a single additional switch cell. The display has three operating states: a wide mode; a private mode; and a 3D mode. Both patterned and unpatterned LC alignment examples are described.

The concept of using a hologram to provide a privacy function which was first described in GB-A-2404991 (US 2005/0063029). However, due to unwanted diffraction of light from the display by the hologram, the colour of the image seen by viewers may be affected. Furthermore, for applications using a touch screen mounted on the front of the display, the user's hand can block the illumination of the hologram and so reduce the effectiveness of the privacy mode.

Co-pending British Patent Application No. 0511536.5 discloses the use of an extra liquid crystal layer located between the existing polarisers of an LCD panel. In this location the extra switch cell can modify the greyscale curves for off-axis light. This provides a higher level of privacy for images than the techniques disclosed in, for example, GB-A-2413394 (US 2005/0243265).

U.S. Pat. No. 5,109,219 describes a method for controlling the viewing angle of a LC display by converting a digital view angle parameter to an analogue bias voltage which is applied to the LC. However, this technique will only serve to modify the view angle characteristics of the display, and will not tend to hide the image at wide angles.

U.S. Pat. No. 5,936,596 and JP 2003-295160 (US 2006/0126156) describe changing the voltage range applied to the pixels in an LC display to change the viewing angle. Look-up tables are used to change the display between narrow and wide view-angle modes. However, this method does not conceal displayed information as such when in the narrow mode, it only modifies the grey-scale mapping to distort the image.

The article "A Method for Concealment of Displayed Data", M. Dogruel, Displays, vol. 24, no. 3, October 2003, describes a method for concealing data shown on a display by time-sequentially rendering the image and its inverse at a rate faster than the human eye can perceive. The eye of a casual observer thus averages the images and therefore sees a uniform grey display screen. To see the private image, the user must wear shuttered glasses synchronised with the display, such that the inverse image is blocked. This method has a number of drawbacks: firstly, the user must wear shuttered glasses in order to observe the correct image; secondly, image privacy can also be compromised by rapidly moving a toothed object across the view of the display and thus obscuring some parts of the cancelling image; and thirdly a ghost image can be observed as it is very difficult to design the two images to cancel perfectly. This article also describes adding a third image to act as a confusing image, but this requires the display to run at three times the normal video rate.

Rocket Software, Inc. (http://www.rocketsoftware.com) have developed a software package that provides some level of privacy using the inherent properties of an LC display. The software modifies the image sent to the display by applying an extra patterning across the whole image that reduces the grey levels or contrast of the image. Due to the non-linear response of the display, the level of reduction is such that, when viewed on-axis, the image is only slightly disturbed but, when viewed off-axis, the non-linear response of the display leads to an enhanced contrast patterning. However, this solution does inevitably affect the on-axis performance of the display in some degree, and the pattern visibility will disturb even the authorised user when using the display in the private mode. Further, in practice, the patterning is not sufficient to provide an adequate level of privacy off-axis.

WO 03/015424 discloses a light switching apparatus that comprises a passive birefringent lens and a switchable polariser. By switching the polarisation, different directional distributions of output light are provided. However, when activated, the lenses do not discriminate in angle which light is imaged.

U.S. Pat. No. 6,369,949 discloses an optically anisotropic micro-lens window. The imaging element described is not switchable, and consequently a device making use of this technology could not be switchable between public and private modes of operation.

GB-A-2410339 discloses the use of multiple arrays of polarisation sensitive lenses in a polarisation optical conversion system.

JP 09-230377 and U.S. Pat. No. 5,844,640 describe a method of changing the viewing angle properties of a single layer LCD panel. This is achieved for a Vertically Aligned Nematic (VAN) LC mode. Electric fields in the plane of the display panel are used to control how the LC material tilts in a pixel area. The number and orientation of different tilt domains within a pixel can be controlled by the in-plane fields. A pixel with several tilt domains will have a wide viewing angle, while a pixel with one tilt domain will have a narrower viewing angle. The use of such a method to vary the viewing angle of a display is described. However, the viewing angle of a single tilt domain of the VAN mode described is generally not sufficiently narrow to provide a good privacy mode.

JP 3405972 describes a single LC panel which uses patterned LC alignment to provide a narrow viewing angle mode LCD. However, this narrow mode is fixed, and there is no wide viewing mode.

SUMMARY OF THE INVENTION

According to a first aspect of the present invention, there is provided a display device comprising a liquid crystal display panel for displaying an image by spatial light modulation, and circuitry for switching liquid crystal in the panel between having a first configuration in a first mode to cause an image displayed using the panel to be discernible from a wide range of viewing angles, and having a second configuration in a second mode to cause an image displayed using the panel to be discernible substantially only from within a narrow range of viewing angles.

The second configuration of liquid crystal may cause an image-confusing pattern to be visible in the image discerned by a viewer outside the narrow range of angles.

The liquid crystal in the first configuration may comprise a single arrangement of liquid crystal across the display device.

The liquid crystal in the first configuration may comprise a plurality of lateral regions each having one of at least two different arrangements of liquid crystal The first configuration regions may be sized so as not to be resolvable by a viewer.

The liquid crystal in the second configuration may comprise a plurality of lateral regions each having one of at least two different arrangements of liquid crystal.

The second configuration regions may be sized so as to be resolvable by a viewer.

The second configuration regions may have a lateral dimension at least two times greater than a lateral dimension of a picture element of the panel.

The second configuration regions may have a lateral dimension at least five times greater than a lateral dimension of a picture element of the panel.

The second configuration regions may have a lateral dimension at least ten times greater than a lateral dimension of a picture element of the panel.

The second configuration regions having the same or similar liquid crystal arrangement may be arranged spatially in a predetermined manner.

The second configuration regions of the same or similar liquid crystal arrangement may be arranged spatially in a chequerboard pattern or a pattern of text or a logo.

The circuitry may comprise a plurality of in-plane electrodes for switching the liquid crystal to the second configuration.

The circuitry may comprise in-plane electrodes disposed at least to or at or towards each side of each second configuration region.

The circuitry may comprise three or more in-plane electrodes disposed within each second configuration region.

The in-plane electrodes may be patterned in at least two different orientations to produce the at least two different arrangements.

The electrodes may be disposed on the same side of the liquid crystal display panel as electrodes used for switching picture elements of the panel.

Neighbouring regions may be arranged to have different arrangements of liquid crystal.

The at least two arrangements may comprise liquid crystal having different respective substantially uniform orientations of liquid crystal.

The at least two arrangements may comprise one or more pairs of orientations, the orientations in the or each pair being disposed substantially symmetrically about a predetermined axis.

The predetermined axis may lie in the narrow range of viewing angles.

The at least two different arrangements of liquid crystal may have different respective angular transmission functions.

The respective angular transmission functions may be asymmetric about an axis lying within the narrow range of viewing angles.

The respective angular transmission functions for the second configuration may be substantially equal for viewing angles within the narrow range, and different for viewing angles outside the narrow range.

The respective angular transmission functions for the first configuration may be spatially averaged by a viewer in the first mode to provide a smoothly-varying average transmission function across at least part of the wide range of viewing angles.

The average transmission function may vary smoothly across the whole of the wide range of viewing angles.

The first and second configurations may be vertically aligned nematic configurations.

The first and second configurations may be bi- or multi-stable liquid crystal states, and the circuitry may be adapted to switch the liquid crystal between these states.

The display device may comprise an alignment layer for producing the bi- or multi-stable states.

The first configuration may be a continuous pinwheel aligned configuration.

An image may be represented by a plurality of image elements, and the display device may comprise means for modifying the respective data values of at least some of the image elements such that when the modified image is displayed in a first scenario using a display panel having a first data value-to-luminance response to a viewer, the image perceived by the viewer through spatial averaging is substantially the same as the original image, and such that when the modified image is displayed in a second scenario using a display panel having a second data value-to-luminance response to a viewer, different to the first data value-to-luminance response, the image perceived by the viewer through spatial averaging is different to the original image, and wherein the first and second configurations of liquid crystal are arranged to provide the display panel with substantially the first and second data value-to-luminance responses respectively for viewing angles outside the narrow range, and are both arranged to provide substantially the first data value-to-luminance response for viewing angles inside the narrow range.

The second data value-to-luminance response may be a non-linear data value-to-luminance response.

The first data value-to-luminance response may be a substantially linear data value-to-luminance response.

The first configuration regions may be adapted such that light travelling at an angle outside the narrow range of angles passes through at least two regions having different arrangements of liquid crystal so as to have the first data value-to-luminance response.

The second configuration regions may be adapted such that light travelling at an angle outside the narrow range of angles has the second data value-to-luminance response.

The first and second configurations may be twisted nematic configurations.

The display device may comprise at least one patterned alignment layer for producing the first and second configurations.

The circuitry may be operable to apply an electric field to change the alignment properties of the at least one alignment layer to switch the liquid crystal between the first and second configurations.

The circuitry may be operable to apply an electric field across and/or in the plane of the liquid crystal to switch the liquid crystal between the first and second configurations.

The circuitry may be operable to apply fringe electric fields.

The original image may be substantially hidden in the image perceived in the second scenario.

At least some of the data values may be modified in dependence upon a masking image.

Each data value may be modified in dependence upon the data value at a corresponding position of the masking image.

The image perceived in the second scenario may resemble at least to some extent the masking image.

The masking image may be such as to provide a high degree of visually confusing information in the second scenario.

The masking image may comprise a chequerboard pattern or a pattern of text or a logo.

Different masking images may be used in different time frames.

At least some of the data values may be modified in dependence upon a masking parameter.

The degree of modification may be determined at least in part by the masking parameter.

The data values may be modified such that localised groups of displayed image elements are perceived in the first scenario through spatial averaging to have substantially the same overall luminance as those image elements would have done without such modification.

The degree of modification for each image element in a group may be determined in dependence upon the data value at a position in the masking image corresponding to the image element.

If any modification is to be performed for a group, the data value of at least one image element in the group may be increased while the data value of at least one other image element in the group may be decreased.

The amount of increase may be substantially the same as the decrease.

The amount of increase relative to the amount of decrease may be determined in dependence upon the first data value-to-luminance response.

The image elements designated for increase and decrease may be swapped in different time frames.

For each of the at least one image element an amount related to the corresponding respective masking image data value may be added to the image element data value, and for each of the at least other one image element an amount related to the corresponding respective masking image data value may be subtracted from the image element data value.

The amount may be equal to the corresponding masking image data value.

The amount may be determined in dependence upon the difference between the image data value and the maximum or minimum data value, whichever is closer.

The amount may be proportional to the difference multiplied by the corresponding masking image data value.

Each group may comprise two image elements.

The data values of at least some of the image elements may be averaged in a group.

The data values of at least some of the masking image elements may be averaged in a group.

Image elements having corresponding modifications performed on them may be arranged in lines of the image.

Image elements having corresponding modifications performed on them may be arranged in columns of the image.

Image elements having corresponding modifications performed on them may be arranged in a chequerboard pattern or a pattern of text or a logo.

It may be ensured that a modified data value does not fall outside the normal range of data values allowed.

The data value range of the image may be compressed before modification.

The data value range of the masking image may be compressed before modification.

It may be that only the data values of the image elements in a sub-portion of the image are so modified.

Each image element may relate to a plurality of colour components corresponding to a pixel of the display device.

Each image element may relate to a single colour component corresponding to a sub-pixel of the display device.

The viewer may be at least a predetermined distance away from the display device.

The circuitry may be adapted to operate the display panel to apply an electric field in first and second different ways in the first and second modes respectively to achieve the first and second liquid crystal configurations.

The circuitry may be adapted to operate the display panel using different respective ranges of applied electric field strengths in the first and second modes.

The circuitry may be adapted to operate the display panel using different respective directions of applied electric field in the first and second modes.

The circuitry may be adapted to operate the display panel using in-plane switching in the first mode and electrically controlled birefringence switching in the second mode.

The circuitry may comprise a first set of electrodes for performing the in-plane switching and a second set of electrodes for performing the electrically controlled birefringence switching.

The first set electrodes may be disposed on the same side of the display panel to apply a field substantially in the plane of the panel.

The second set electrodes may be disposed on opposite sides of the display panel to apply a field across the panel.

The display panel may comprise first and second sets of regions, and the circuitry may be adapted to apply the electric field in the first and second ways in the first and second sets of regions respectively.

Pixels of the display may each comprise a region from the first set and a region from the second set.

The circuitry may be operable in the second mode to operate some pixels in the first way and other pixels in the second way so as to cause an image confusing pattern to a viewer outside the narrow range of viewing angles.

Pixels of the display may each comprise first and second regions having liquid crystal respectively having the first and second configurations.

The circuitry may be operable in the second mode to operate some pixels using the first regions and other pixels using the second regions so as to cause an image confusing pattern to a viewer outside the narrow range of viewing angles.

The circuitry may be adapted to operate in the second mode to use different respective driving voltage ranges to produce the at least two different arrangements of liquid crystal, the liquid crystal arrangements being such as to have substantially the same transmission to viewers within the narrow range of angles for different respective voltages selected from each of the driving voltage ranges and different respective transmissions for those selected voltages to viewers outside the narrow range of angles.

A first one of the driving voltage ranges may have a transmission-to-voltage function suitable for image display to viewers outside the narrow range of angles and a second one of the driving voltage ranges may have a transmission-to-voltage function unsuitable for image display to viewers outside the narrow range of angles.

The second one of the driving voltage ranges may have a substantially constant, low, transmission to viewers outside the narrow range of angles for voltages across at least most of the range.

The substantially constant, low, transmission may be a substantially zero transmission.

The second one of the driving voltage ranges may have a substantially constant, high, transmission to viewers outside the narrow range of angles for voltages across at least most of the range.

The circuitry may be adapted to operate in the first mode to use only the first one of the driving voltage ranges for each of the lateral regions to produce a substantially uniform arrangement of liquid crystal across the panel.

The circuitry may be adapted to operate in the second mode to use different respective ground electrode voltage arrangements to produce the at least two different arrangements of liquid crystal, the liquid crystal arrangements being such as to have substantially the same transmission to viewers within the narrow range of angles for different respective voltage arrangements and different respective transmissions for those voltages to viewers outside the narrow range of angles.

The circuitry may be adapted to cause the first and second arrangements of liquid crystal to be skewed with respect to one another.

The circuitry may comprise a patterned electrode.

The narrow range of viewing angles may be disposed about the normal to the display panel.

According to a second aspect of the present invention, there is provided a liquid crystal display panel for use in a display device for displaying an image by spatial light modulation, the display panel being adapted to enable switching of liquid crystal in the panel between having a first configuration in a first mode to cause an image displayed using the panel to be discernible from a wide range of viewing angles, and having a second configuration in a second mode to cause an image displayed using the panel to be discernible substantially only from within a narrow range of viewing angles.

According to a second aspect of the present invention, there is provided an operating program which, when loaded into an apparatus, causes the apparatus to become apparatus according to the first aspect of the present invention.

The operating program may be carried on a carrier medium. The carrier medium may be a transmission medium. The carrier medium may be a storage medium.

BRIEF DESCRIPTION OF THE DRAWINGS

Reference will now be made, by way of example, to the accompanying drawings, in which:

FIGS. 6(A) to 6(C) is a schematic diagram illustrating the modification of data values in the second embodiment;

FIGS. 14(A) and 14(B) are schematic illustrations of greyscale responses on and off axis respectively for a display panel according to a fourth embodiment of the present invention;

FIG. 15 illustrates a display panel suitable for use in the fourth embodiment;

FIGS. 18(A) and 18(B) illustrate a fifth embodiment of the present invention;

DESCRIPTION OF THE EMBODIMENTS

Figure 1:
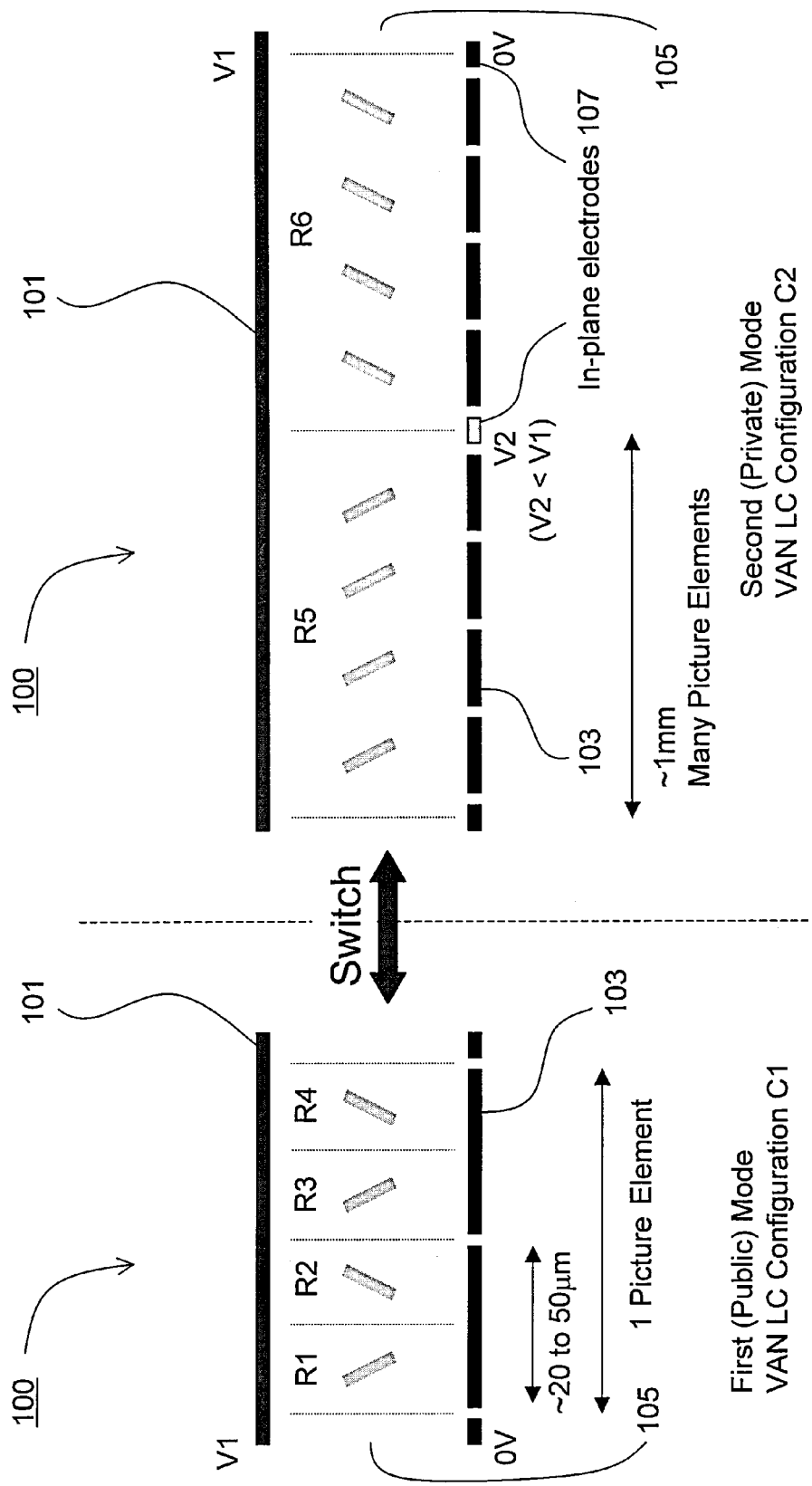
FIG. 1 is a side view of a display panel according to a first embodiment of the present invention showing operation in wide and narrow viewing modes.

FIG. 1 illustrates a display device incorporating a liquid crystal display panel 100 according to a first embodiment of the present invention. The liquid crystal display panel 100 displays an image by spatial light modulation, using opposed electrodes 101 and 103 disposed across a layer of liquid crystal material 105. The electrode 103 is segmented so as to enable switching of the liquid crystal into two or more different orientations within a single picture element. Within a single picture element the same voltage is applied to all areas of the segmented electrode 103. Preferably several regions of the two or more different orientations are formed within a single picture element. Switching into the different orientations is controlled by the fringing electric fields produced at the edges of the segmented electrode 103. Alternatively other methods of producing fringing electric fields, such as protrusions on the electrode surface, may be used.

As explained in more detail below, the liquid crystal display panel 100 also comprises circuitry 107 in the form of in-plane electrodes, for switching the liquid crystal 105 between having a first configuration C1 in a first (public or wide) mode and having a second configuration C2 in a second (private or narrow) mode. The first liquid crystal configuration C1 causes an image displayed using the panel 100 to be discernible by a viewer from a wide range of viewing angles, while the second liquid crystal configuration C2 causes an image displayed using the panel 100 to be discernible by a viewer substantially only from within a narrow range of viewing angles. As illustrated in FIG. 1, the display device according to the first embodiment comprises only a single liquid crystal display panel 100. No additional optical components or layers are required in the first embodiment to achieve switching between the two modes of operation.

FIG. 1 shows, in the left-hand portion, one suitable example of the first liquid crystal configuration C1 in the first (wide) mode of operation. The first liquid crystal configuration C1 in this example has two or more regions or domains (referred to from herein onwards as regions) of different liquid crystal orientation within a single pixel. Illustrated are four different regions R1 to R4, with regions R1 and R3 having a first liquid crystal arrangement and regions R2 and R4 having a second liquid crystal arrangement, different to the first liquid crystal arrangement. In FIG. 1 the combination of the four different regions R1 to R4 forms a single picture element.

The first arrangement comprises liquid crystal having a substantially uniform first orientation of liquid crystal, while the second arrangement comprises liquid crystal having a substantially uniform second orientation of liquid crystal, different to the first orientation, with first and second orientations arranged in region pairs. The first and second orientations are disposed substantially symmetrically about the normal to the display panel 100. In the example illustrated in FIG. 1, the first liquid configuration is a two-domain Vertically Aligned Nematic (VAN) configuration.

In the first (wide) mode, the size of these regions R1 to R4 is smaller than can be resolved by a viewer, for example of the order of 10 to 25 μm across. The properties of the unresolvable regions average to produce a wide viewing angle characteristic for the liquid crystal display panel 100. This will be explained further with reference to FIG. 2 below. The multiple regions of different liquid crystal orientation within a pixel are formed by fringing fields from the patterned electrode 103 or from protrusions on the electrode surface. An image is displayed on the liquid crystal display panel 100 in a known way by applying a switching voltage V1 across the liquid crystal layer 105.

In the second (narrow) mode, the in-plane electrodes 107 are used to provide electric fields substantially within the plane of the liquid crystal layer 105. To achieve this, a voltage of V2 is applied across adjacent in-plane electrodes 107, where V2 would typically be less than V1. These in-plane fields overcome the effect of the fringing fields from the segmented electrode 103 and switch the liquid crystal layer into a second liquid crystal configuration C2 having larger regions R5 and R6, as illustrated in the right-hand portion of FIG. 1. Regions R5 and R6 have different respective liquid crystal arrangements, the two liquid crystal arrangements having substantially uniform different respective orientation of liquid crystal. The two different orientations are disposed substantially symmetrically about the normal to the display panel 100.

The regions R5 and R6 in the second (narrow) mode are large enough to be resolved by a viewer, and would typically be much larger than a pixel, for example of the order of 1 mm or more across. As a result, and as explained in more detail below, the effect of the regions R5 and R6 is clearly visible by an off-axis viewer (but the effect of the regions is hidden for an on-axis viewer). The regions R5 and R6 in the second (narrow) mode are arranged to provide a pattern that will obscure and confuse the underlying image for an off-axis viewer in the second (narrow) mode. One example of such a pattern is a chequerboard, although any suitable pattern can be used.

Figure 2:
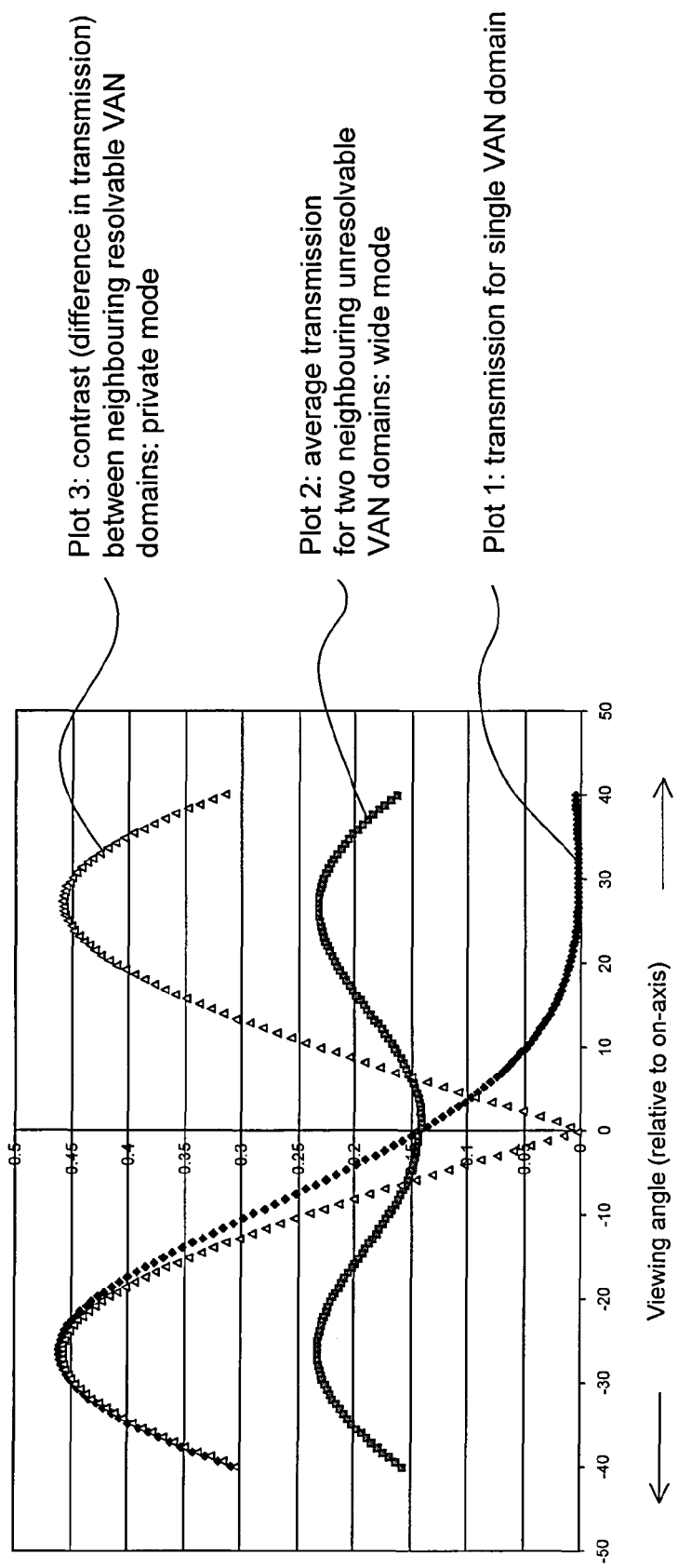
FIG. 2 is a chart for use in explaining operation of the first embodiment.

The function of the first embodiment is further illustrated in FIG. 2. Plot 1 of FIG. 2 shows the transmission as a function of angle of view for a single VAN region, measured relative to the perpendicular to the panel, i.e. for a single liquid crystal orientation. The angular transmission function is asymmetric relative to the on-axis direction due to the off-axis orientation of the liquid crystal molecules.

Suppose Plot 1 represents the angular transmission function for regions have the liquid crystal orientation as shown in region R1, then the angular transmission function for regions having the liquid crystal orientation as shown in region R2 will be as for Plot 1, but reflected in the vertical axis.

As explained above, in the first (wide) mode, neighbouring regions, for example regions R1 and R2 in FIG. 1, are not resolvable by a viewer. Since these two regions R1 and R2 are not resolvable, the viewer sees an average transmission for the two regions R1 and R2 for all viewing angles. The resulting angular transmission function is shown in Plot 2 of FIG. 2, which varies across viewing angle within acceptable bounds.

As explained above, in the second (narrow) mode the size of the VAN regions R5 and R6 is such that, instead of an average of the two domains, a viewer sees the domains as a distinct pattern because of the difference in transmission between the two regions for a particular viewing angle. This difference will increase with viewing angle.

Due to the symmetry of liquid crystal orientation about the perpendicular to the display panel 100, when viewed on-axis both regions R5 and R6 exhibit the same transmission, and so the effect of the different regions is not apparent to the on-axis viewer. An image is displayed in the standard way by applying a switching voltage V1 across the liquid crystal layer 105.

Away from the perpendicular direction, the two regions R5 and R6 give different transmission for the same applied voltage. Therefore an off-axis viewer will see the pattern of the VAN domains as a pattern of differing brightness. This pattern will obscure the underlying image. The contrast between the two regions in the second (private) mode is illustrated by Plot 3 of FIG. 2, which is the difference in transmission between adjacent regions R5 and R6 for each viewing angle.

In this way a good privacy function can be achieved with the first embodiment of the present invention by switching the liquid crystal layer 105 itself, without the need for additional layers.

Instead of or as well as using electric field switching of the liquid crystal layer 105 as described above, the alignment layer can also be switched to produce the wide and narrow viewing modes. One method of switching the alignment is the use of very fine patterning of an alignment layer as described by Kim et al., 'Surface alignment bistability of nematic liquid crystals by orientationally frustrated surface patterns', Applied Physics Letters, Vol 78, Is 20 (2001) 3055. Another method, disclosed in EP0856164 and Kitson and Geisow, 'Controllable alignment of nematic liquid crystals around microscopic posts: Stabilization of multiple states' Applied Physics Letters, Vol 80, Is 19 (2002) 3635, uses an alignment layer consisting of periodic microstructures. These microstructures also induce bistable or multistable alignment of the liquid crystal. A further method, disclosed in U.S. Pat. No. 6,549,255, uses a polymer alignment layer whose alignment properties can be switched with an applied field.

A second embodiment of the present invention, also making use of an in-panel liquid crystal switching technique to achieve switching between a public and private mode, will now be described with reference to FIGS. 3 to 12.

Figure 3:
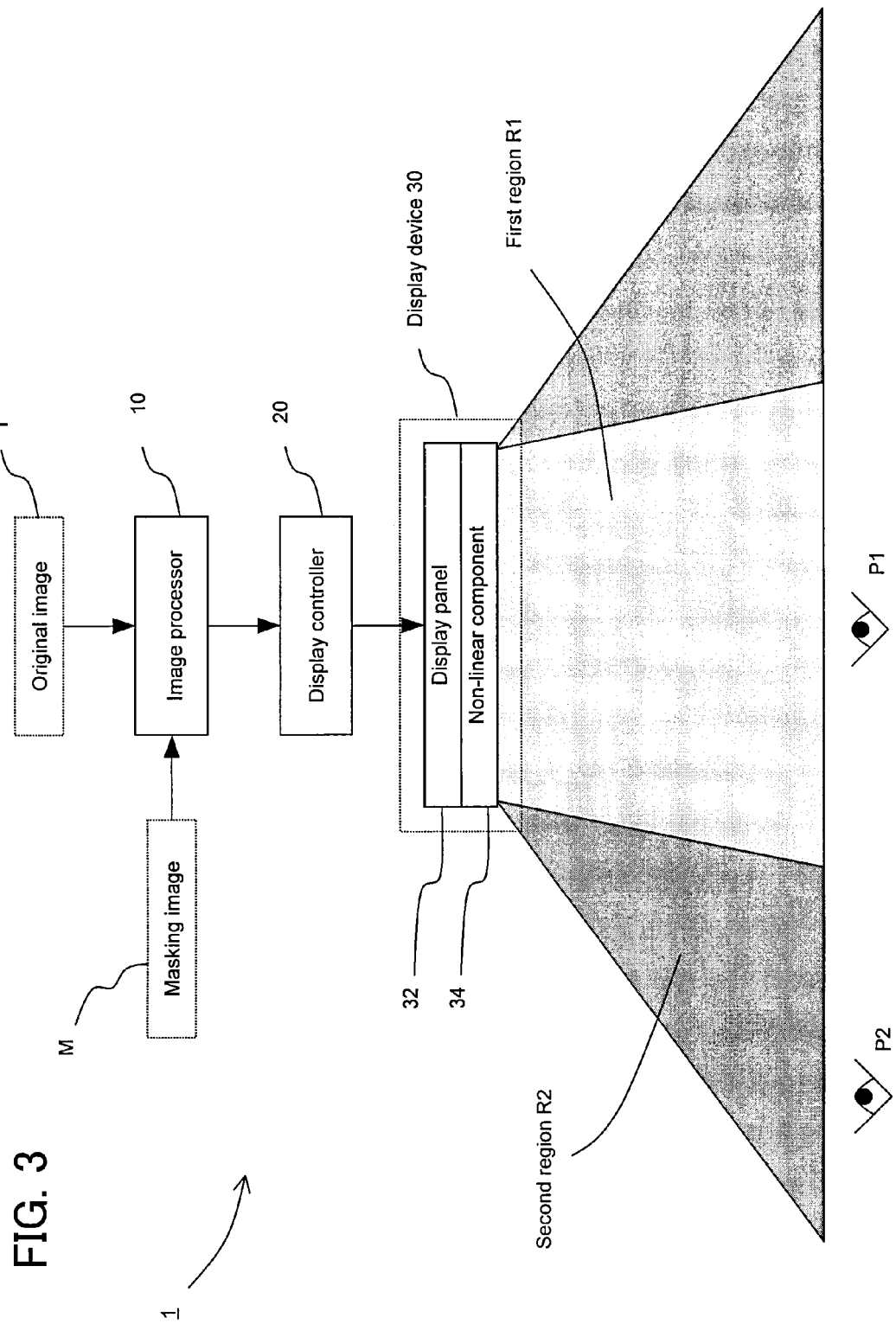
FIG. 3 is a block diagram illustrating a display device for use in explaining a second embodiment of the present invention.
Figure 4:
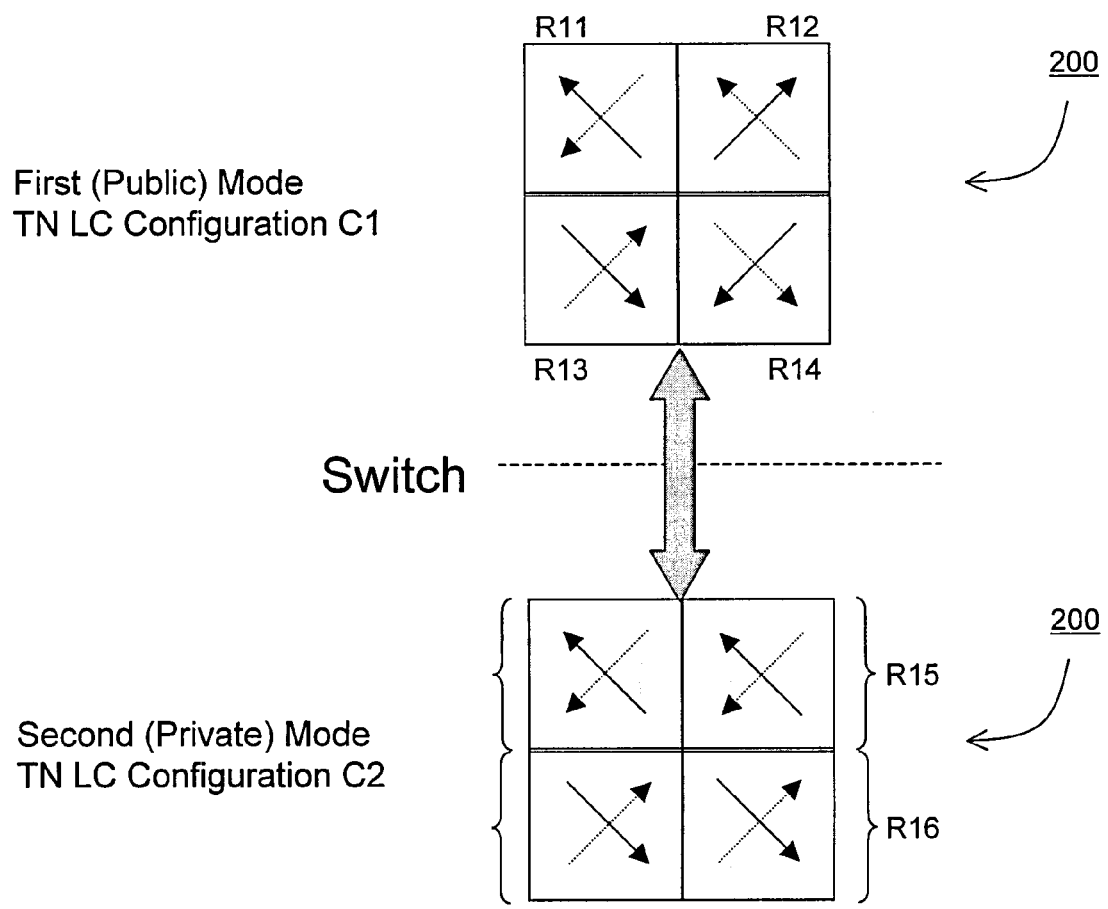
FIG. 4 is a plan view of a display panel for use in the second embodiment, showing operation in wide and narrow viewing modes.

FIG. 3 is a block diagram illustrating an image display system 1 for use in explaining a second embodiment of the present invention. The image display system 1 comprises an image processor 10, a display controller 20 and a display device 30. The display device comprises a display panel 32 and a non-linear component 34. A liquid crystal display panel 200 according to the second embodiment is illustrated in FIG. 4, and is intended to replace the display panel 32 and a non-linear component 34 of FIG. 3, as will be described below. Referring to FIG. 3, an original image I is to be displayed on the display panel 32 of the display device 30. The original image I is represented by a plurality of image elements, which may correspond to pixels of the display panel 32 or sub-pixels of the display panel 32. If the original image I is displayed directly on the display device 30, then the image will be viewable both by a viewer positioned on-axis at a position P1, and by a viewer positioned off-axis at a position P2. The first and second positions P1 and P2 are within first and second viewing regions R1 and R2 respectively.

The second embodiment of the present invention enables a mode of operation in which the image seen by a first viewer located at position P1 relative to the display device 30 is substantially the same as the original image I, whereas the image seen by a second viewer located at position P2 relative to the display device 30 is different from the original image I. The masking image M is used for this purpose, as will now be explained in connection with a first example of the second embodiment.

Figure 5:
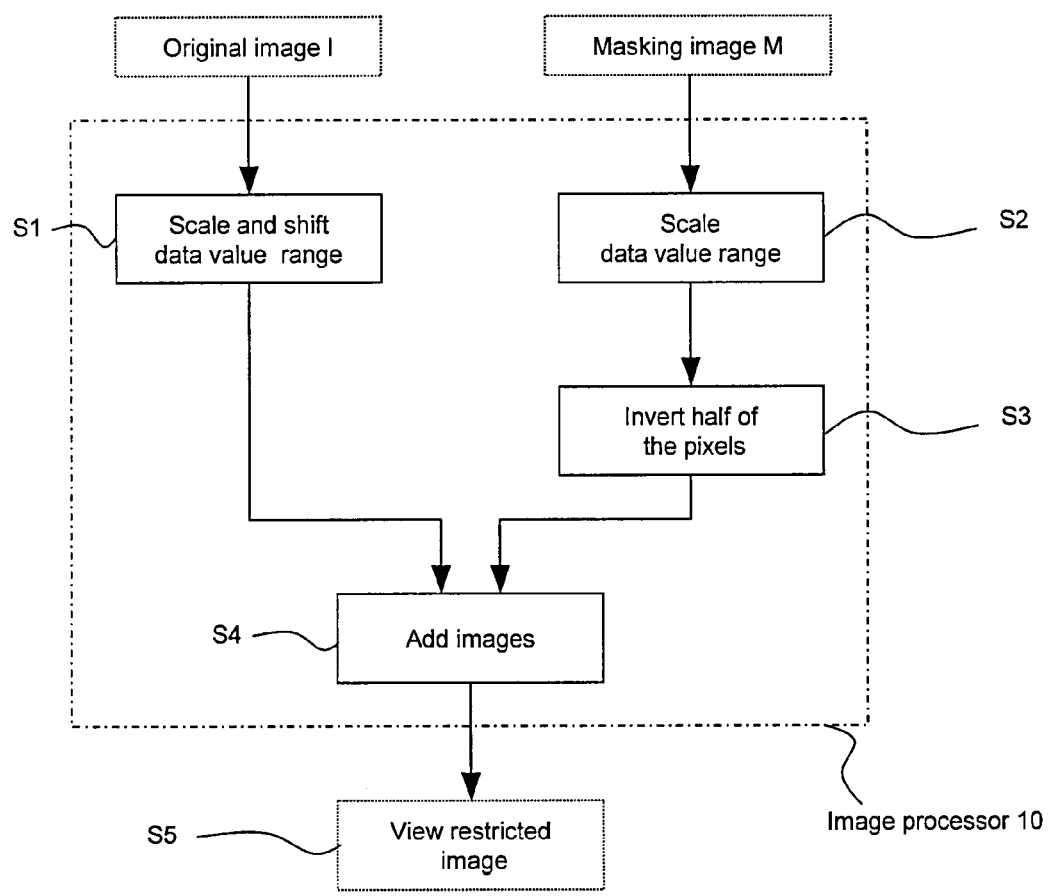
FIG. 5 is a flow diagram illustrating the operation according to a first example of the second embodiment.
Figure 7:
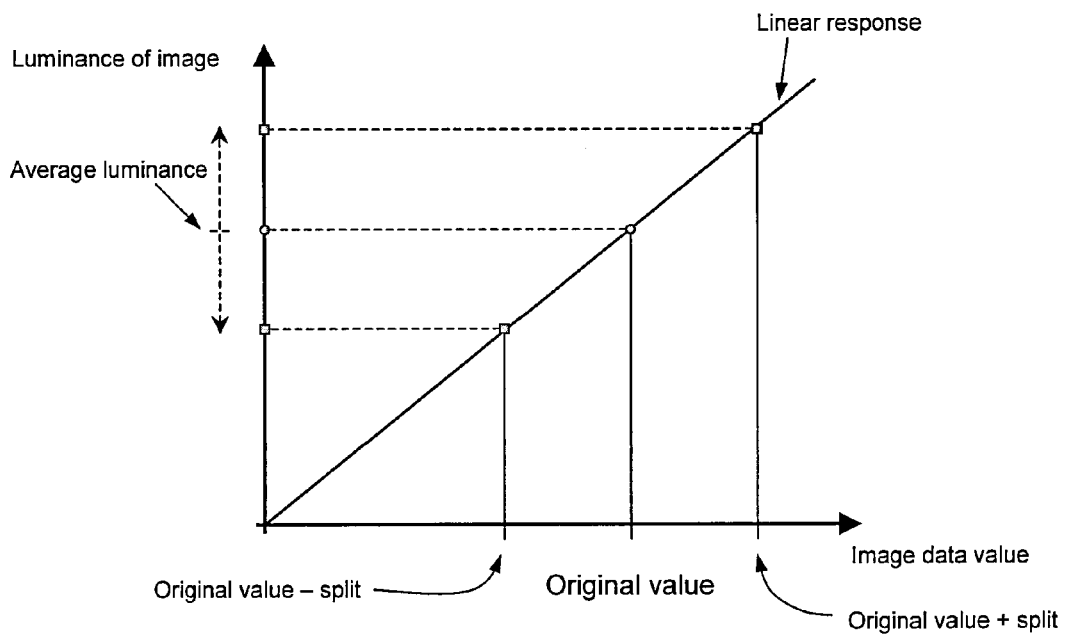
FIG. 7(A) is a chart illustrating a linear data value-to-luminance response in the second embodiment.
FIG. 7(B) is a chart illustrating a non-linear data value-to-luminance response in the second embodiment.
Figure 7:
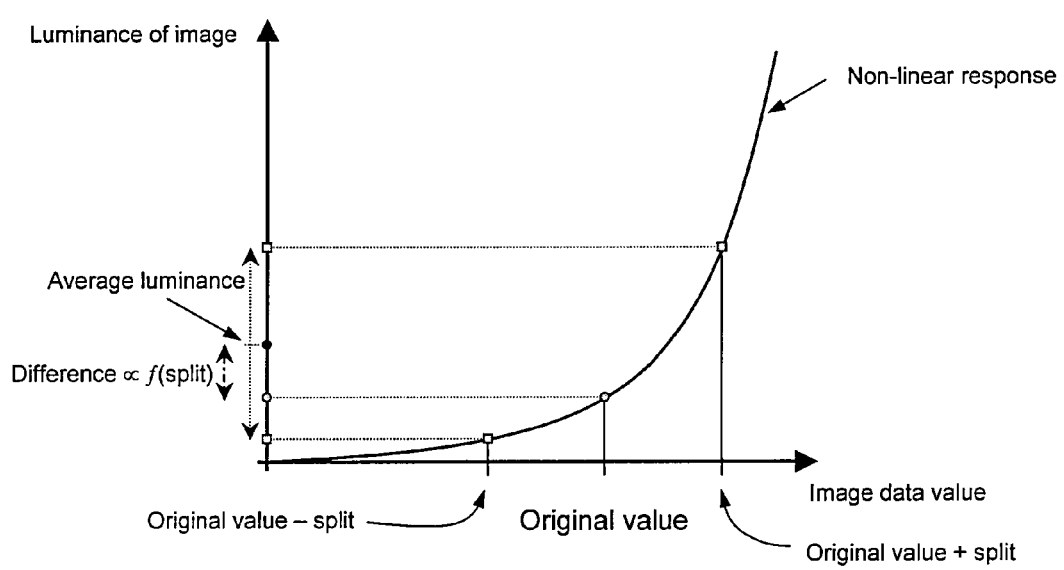

Operation of the first example of the second embodiment will be described with reference to FIGS. 5 to 9. FIG. 5 is a flow diagram providing an overview of the operations performed by the image processor 10 in the first example of the second embodiment. Before considering in detail the steps performed by the image processor 10, a more general description of the concept underlying an embodiment of the present invention will first be described with reference to FIGS. 6 and 7.

When a viewer is located more than a predetermined distance away from the display panel 32 of the display device 30, the viewer is unable to resolve each individual pixel or image element being displayed. A guideline for use in estimating an adequate viewer-display separation for this to be the case is provided in "Color and Light in Nature", D. Lynch & W Livingston, Cambridge University Press, 1995, which suggests that the eye's resolution is limited to 1 arc minute. Applying this to the present embodiment, two pixels or image element should preferably subtend an angle of less than 1 arc minute. It is to be understood that this is merely a guideline and that other resolutions may be applicable in different circumstances.

Instead of being able to resolve each individual pixel or image element, the human eye will spatially average a localised group of displayed image elements to perceive a single overall luminance. It should be noted that the localised group of displayed image elements may not correspond to arrangement of these image elements in the original image, for example because the image elements may be interlaced or otherwise re-arranged before display. The second embodiment of the present invention takes advantage of this, together with the data value-to-luminance response of the display device 30, as will now be explained.

FIG. 6(A) shows one such localised group comprising two image elements having the same data value. Before display, the image processor 10 in an embodiment of the present invention splits the original data value equally into two new data values, such that the data value of one of the image elements is equal to the original data value minus the splitting amount, and the data value of the other image element is equal to the original data value plus the splitting amount.

When displayed on a display device having a linear data value-to-luminance response, a viewer will perceive the two modified data values of the localised group to have the same overall luminance as those image elements would have done without such modification. This is because, due to the linear response of the display device, the single original data value maps to the same luminance as the average luminance of the two modified image elements. This is illustrated in FIGS. 6(B) and 7(A).

On the other hand, when the modified image elements in the localised group are displayed on a display device having a non-linear data value-to-luminance response to a viewer in a predetermined position relative to the display device, the luminance of these image elements is no longer spatially averaged by the eye of the viewer to have the same overall luminance as those image elements would have done without such modification. Instead, the viewer perceives a luminance which differs from a straight average by an amount which depends on the non-linearity of the display. This is illustrated in FIG. 7(B) and FIG. 6(C).

The switching voltage applied to a pixel in a Liquid Crystal Display (LCD) device is usually compensated such that, when viewed on-axis, a change in the data sent to the pixel causes a proportional change in the observed luminance. However, light passing through the panel 32 at an angle other than the normal to the panel 32 will travel a different optical path length through the Liquid Crystal (LC) and will therefore be affected differently. This change in optical path length can introduce a non-linear relationship between the pixel data and the observed luminance off-axis.

Because of this, the data value-to-luminance response to a viewer in a first position P1 substantially normal to the display panel 32 will be substantially linear, and the image perceived by such a viewer through spatial averaging will be substantially the same as the original image.

On the other hand, the data value-to-luminance response to a second viewer at position P2 off-axis relative to the display panel 32 can be non-linear, and the image perceived by such a viewer through spatial averaging can therefore be different to the original image.

The required difference in the first and second data value-to-luminance responses is sometimes inherent in the properties of the display device itself. However, some displays are compensated to remove the non-linearity of the LC, such that the on-axis and off-axis responses are both substantially linear. For such devices, the off-axis non-linearity can be reintroduced by the introduction of the non-linear component 34 shown in FIG. 3 to modify the viewing characteristics of the display. This non-linear component 34 can be a simple unpatterned LC layer. The non-linear component 34 can also be switchable, so that it need only be activated when required. It will be appreciated, however, that for display devices inherently having different luminance responses on- and off-axis the non-linear component 34 is not necessary, although the use of such a component may enhance the performance.

Alternatively, and this is the approach taken in the second embodiment of the present invention, the LC panel itself may be operable to switch between two modes of operation, one in which the display has a constant luminance response and another in which the display has a non-linear luminance response for viewer P2. This would achieve the same effect, but without the need for the extra non-linear component 34. The in-panel switching technique of the second embodiment of the present invention is intended to ensure a non-linear data value-to-luminance response off-axis for use with the method disclosed in the above-mentioned co-pending application. The display panel used for second embodiment will now be described in more detail with reference to FIG. 4.

FIG. 4 illustrates a single-layer liquid crystal display panel 200 according to the second embodiment. The display panel 200 is intended to perform the function of the display panel 32 and the non-linear component 34 combined. The liquid crystal in the display panel 200 is operated to switch between a first configuration C1 in the first (wide) mode of operation as illustrated in the top portion of FIG. 4, and a second configuration C2 in the second (narrow) mode of operation as illustrated in the bottom portion of FIG. 4.

In the illustration of FIG. 4, the first liquid crystal configuration C1 is a four-domain (four-region) twisted nematic (TN) configuration, with four regions R11 to R14 shown. Each of the four regions R11 to R14 has different TN arrangements, each arrangement oriented at 90 degrees with respect to another arrangement.

The second liquid crystal configuration C2 is a two-domain (two-region) twisted nematic (TN) configuration, with two regions R15 and R16 shown. Region R15 occupies the same space as regions R11 and R12, while region R16 occupies the same space as regions R13 and R14. Region R15 has a TN arrangement that is oriented 180 degrees with respect to the TN arrangement of region R16.

The four-region liquid crystal configuration C1 can be fabricated by patterning of the liquid crystal alignment, for example by multi-rubbing or photoalignment. In the first (wide) mode the average transmission of the four regions provides a linear data value-to-luminance response for light transmitted at oblique angles. In this mode, light passes through all four regions having different arrangements of liquid crystal. For each individual region there will be certain directions for which the transmission of light travelling at oblique angles will have a linear data value-to-luminance response and other directions for which the transmission of light travelling at oblique angles will have a non-linear data value-to-luminance response. However due to the averaging of the transmitted light over the four regions the overall data value-to-luminance response is substantially linear in all directions.

In the second (narrow) mode, the alignment is switched to a two-region TN configuration C2, with the regions being orientated so that in the horizontal viewing plane (a plane normal to the page and parallel with the top and bottom edges of the page) the data value-to-luminance response is non-linear for light transmitted at oblique angles. In this mode, both regions R15 and R16 are arranged so that the directions for which the transmission of light travelling at oblique angles will have a non-linear data value-to-luminance response are in the horizontal viewing plane. Therefore the overall data value-to-luminance response, which is an average of the response of the two regions, is non-linear. When such a mode is used in combination with an image processing method disclosed in the above-mentioned co-pending application, a good privacy function can be achieved.

One method of switching the alignment is the use of very fine patterning of an alignment layer as described by Kim et al., 'Surface alignment bistability of nematic liquid crystals by orientationally frustrated surface patterns', Applied Physics Letters, Vol 78, Is 20 (2001) 3055. Another method, disclosed in EP0856164 and Kitson and Geisow, 'Controllable alignment of nematic liquid crystals around microscopic posts: Stabilization of multiple states' Applied Physics Letters, Vol 80, Is 19 (2002) 3635, uses an alignment layer consisting of periodic microstructures. These microstructures also induce bistable or multistable alignment of the liquid crystal. A further method, disclosed in U.S. Pat. No. 6,549,255, uses a polymer alignment layer whose alignment properties can be switched with an applied field.

Instead of or as well as switching the alignment layer as described in the embodiment above, the liquid crystal layer can also be switched using an electric field to produce the wide and narrow viewing modes. Examples are applying an electric field across the liquid crystal layer, applying an electric field in the plane of the liquid crystal layer, and applying fringe fields from a patterned electrode.

Figure 8:
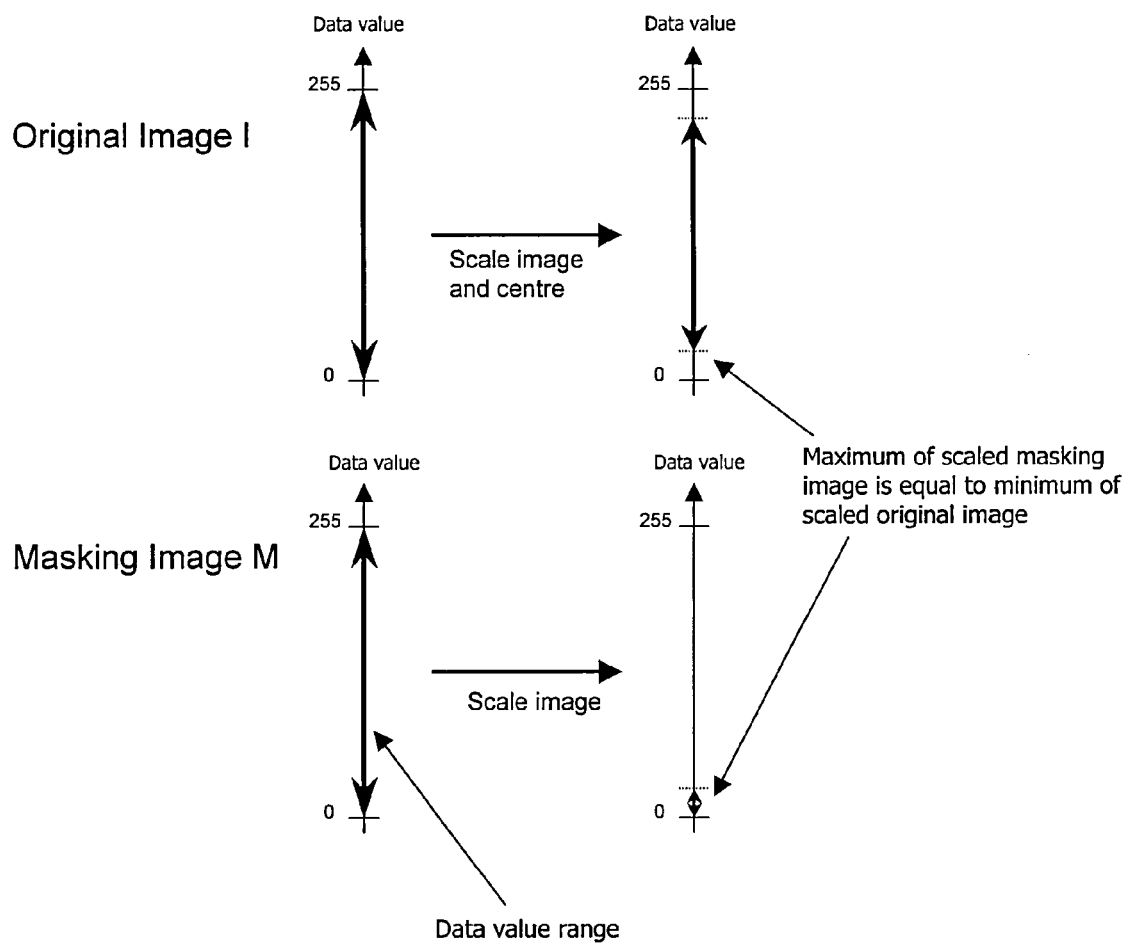
FIG. 8 illustrates the scaling of the original and the masking images in the first example of the second embodiment.
Figure 9:
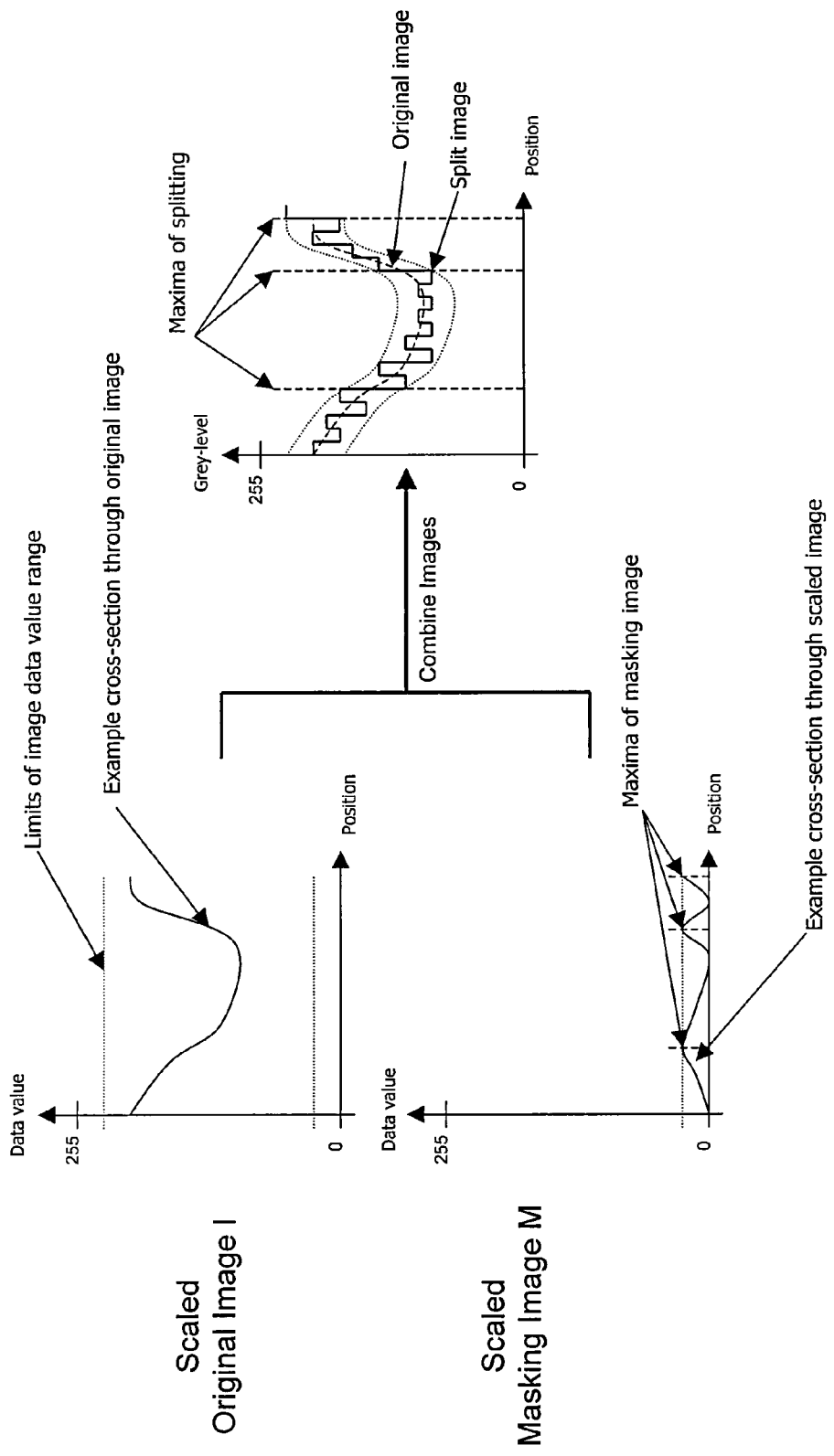
FIG. 9 illustrates the combining of the scaled original and the masking images in the first example of the second embodiment.

A more detailed description of the operation of the first example of the second embodiment will now be provided with reference to FIGS. 5, 8 and 9.

The image elements in the original image I would usually take any value in the range from 0 to 255. Because of this, the splitting as described above with reference to FIG. 6 of a data value close to the minimum or maximum data value would potentially result in a modified data value falling outside the normal range of data values allowed. In order to prevent this, in step S1 of the first example of the second embodiment, the original image I is scaled and centered so as to have a new, compressed data value range; this is illustrated in the top half of FIG. 8. In step S2, the data value range of the masking image M is scaled such that the minimum data value is 0 and the maximum data value is equal to the minimum of the scaled original image; this is illustrated in the bottom half of FIG. 8.

FIG. 9 shows example cross-sections through the scaled original image I and the scaled masking image M. The data value of the masking image at any point determines the level of splitting to be used for the image element at a corresponding position of the scaled original image I. The level of splitting is proportional to the scaled data value of the masking image M, with neighbouring image elements of the scaled original image I being increased and decreased respectively by the splitting level determined from the scaled masking image M. The right-hand part of FIG. 9 shows the result of the combination of the scaled original and masking images I and M, with the greatest degree of splitting occurring at the positions of the maxima of the masking image M.

In the first example of the second embodiment, the splitting amounts are respectively added and subtracted from the scaled original image I by first inverting half of the scaled masking image M data values in step S3, and then adding the resulting pattern of data values to the scaled original image I in step S4. The resulting image is then viewed in S5 by the viewer. The on-axis viewer will perceive an image through spatial averaging that is substantially the same as the scaled original image, while the off-axis viewer positioned at P2 will perceive an image that is different to the original image, resembling at least to some extent the masking image M. For a good privacy mode, the masking image would be such as to provide a high degree of visually confusing information to the off-axis viewer.

Figure 10:
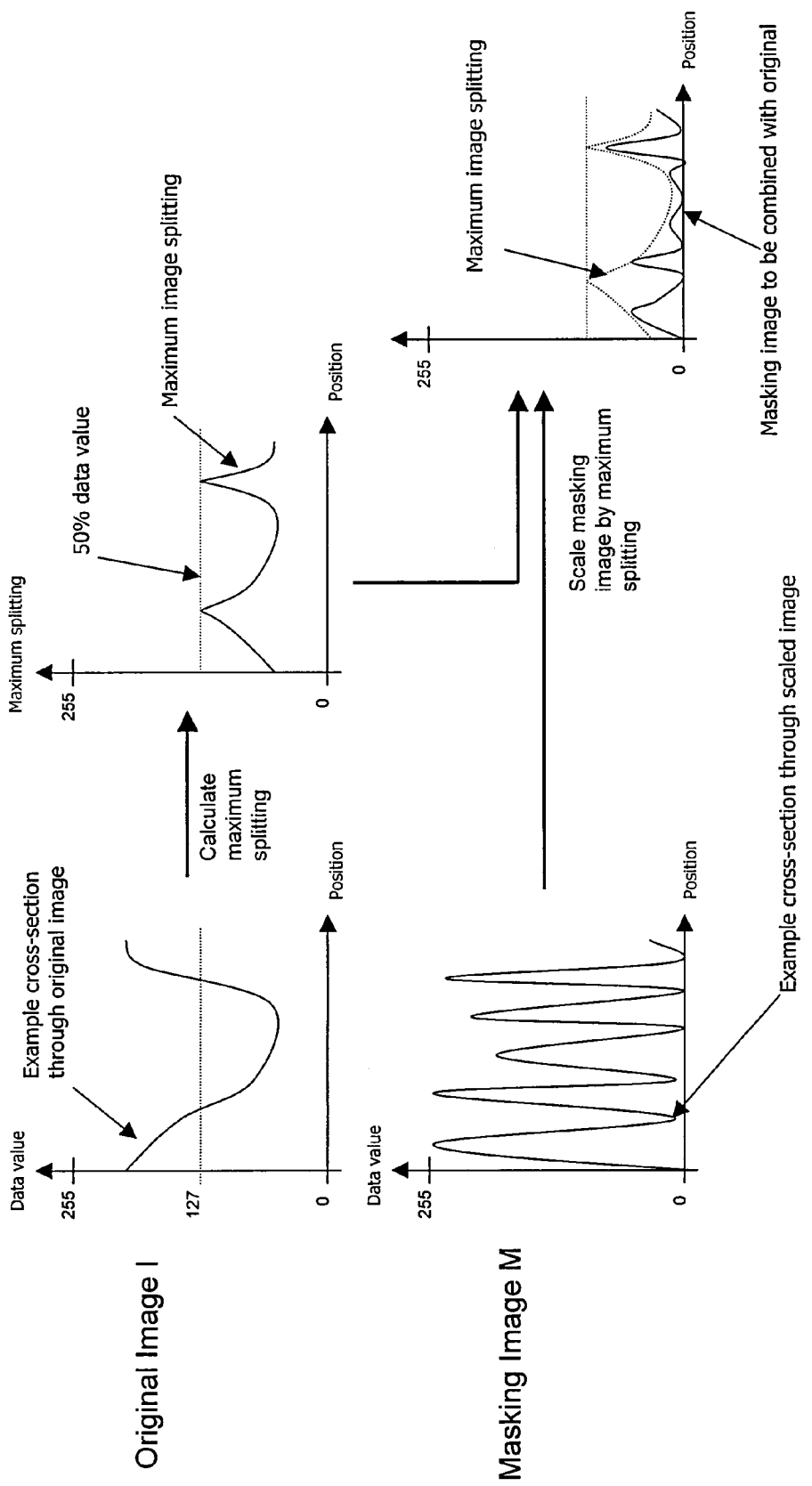
FIG. 10 illustrates the scaling of a masking image in a second example of the second embodiment.
Figure 11:
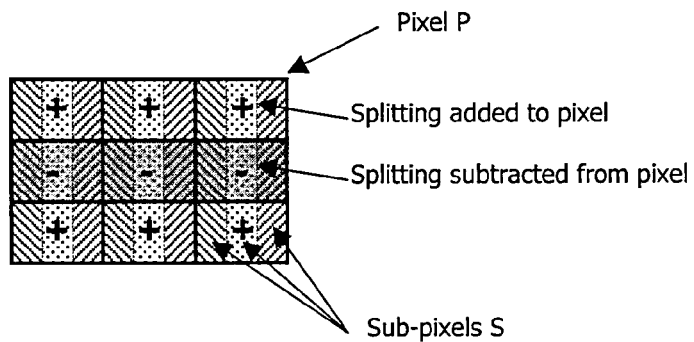
FIGS. 11(A) to 11(C) illustrate various data value modification arrangements suitable for use in the second embodiment.
Figure 11:
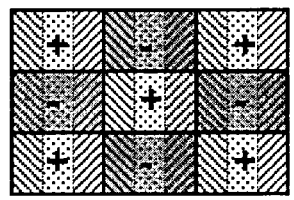
Figure 11:
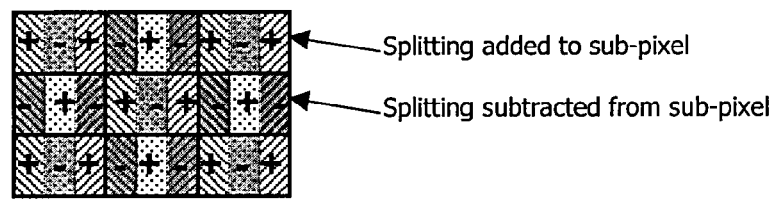

A second example of the second embodiment of the present invention will now be described with reference to FIG. 10. The second example of the second embodiment is similar to the first example of the second embodiment, using the apparatus of FIG. 3, and accordingly will only briefly be described here. The difference between the first and second examples of the second embodiment results from the manner in which the original and masking images I and M are scaled and combined. In the first example of the second embodiment, the scaling of the original image I into a narrower range of data values results in a decrease in the contrast of the image, whereas the method that is performed in the second example of the second embodiment is such that the contrast of the original image is not sacrificed.

In the second example of the second embodiment, the degree of splitting is partially determined by how far the data value of a particular image element is from the closest edge of the allowed data value range. Image elements having data values in the middle of the range will be split the most, while image elements near 0 or 255 will be split the least. Image elements at either extreme of the range will not be split at all. This ensures that the modified data value does not fall outside the allowed range of data values.

Therefore, in the second example of the second embodiment, the difference between the original data value and the maximum or minimum data value, whichever is closer, is calculated, and this effectively sets the maximum level of splitting. This is illustrated in the top half of FIG. 10.

The masking image M is then scaled according to the maximum level of splitting allowed for each image element to produce the scaled masking image M to be combined with the original image I. The actual combination can be performed in a similar way as described above with reference to the first example of the second embodiment.

Therefore, the overall process in the second example of the second embodiment is similar to the overall process in the first example of the second embodiment. Referring to FIG. 5, in the second example of the second embodiment step S1 is omitted, while the scaling of the masking image M in step S2 is performed as described above with reference to FIG. 10. Compared to the first example of the second embodiment, the second example of the second embodiment produces a strong effect on images having a pictorial content, but since saturated pixels undergo little or no splitting, the second example of the second embodiment will have no effect on pure black and white text.

Image elements having corresponding modifications performed on them, for example splitting upwards or splitting downwards, can be arranged to correspond to lines of the display device 30, as shown in FIG. 11(A). Alternatively, corresponding image elements can be arranged in columns, or in a chequerboard pattern as shown in FIG. 11(B). With the arrangements shown in FIGS. 11(A) and 11(B), each image element comprises three separate RGB colour components with each colour component being represented by a data value. Each data value of the image element is modified in the same way.

Alternatively, where each image element comprises three separate RGB colour components, each colour component may be treated independently, so that different colour component data values for the same image element may be split differently. One possible arrangement is shown in FIG. 11(C).

Other ways of combining the original and masking images I and M are possible. For example, as with the first example of the second embodiment, the contrast of the original image I could be reduced, but an asymmetric compression and splitting could be used rather than centering the compressed original image I. This would mean that the contrast of either the light or dark areas are retained preferentially, with the masking image M being compressed as in the first example of the second embodiment but also scaled according to the original image such that the modified data values do not fall outside the allowed range of data values. Other methods would be readily apparent to the skilled person, and any combination of the above methods can be used.

Although it is generally assumed above that the on-axis luminance response of the display device 30 is linear, such that equal splitting of data values will result in the viewer seeing substantially the original image through spatial averaging, if in fact the on-axis luminance response is non-linear, then the splitting can easily be compensated to account for this so that the on-axis viewer still sees substantially the original image through spatial averaging.

Any type of masking image M can be used, depending on the intended application. For example, the masking image could comprise a colour or black and white chequerboard pattern or random noise for a public/private mode application. The masking image could also comprise a logo or other image, text or any other form of information for display only on particular types of display device or to viewers located in particular positions. Animated masking images can also be used.

The image elements in a group, for example the two image elements shown in FIGS. 6(A) to (C), can be averaged before adding and subtracting the masking image, or it can be assumed that they take the same value.

For a masking image, that is not aligned in any way with the image being displayed, it could be the case that the image elements in any localised group would be split by different amounts according to the corresponding data values of the masking image M. It would also be possible to average the masking image data values such that the same degree of splitting is applied to both or all image elements in a group. The number of image elements averaged together can be two or more. Although the example described above with reference to FIG. 6 showed the image elements being considered in pairs, this is not essential, and any number of image elements can be considered in a localised group of image elements, it merely being necessary that the localised group of image elements are perceived by the on-axis viewer through spatial averaging to have substantially the same overall luminance as those image elements would have done without modification. The spatially averaged pixels could also be reversed time sequentially, so that in one frame a pixel may have the masking image added, and in a subsequent time frame the masking image would instead be subtracted (with an equivalent reversal for its neighbour).

Although the above description of the second embodiment has referred to localised groups of displayed image elements, it is to be understood that this is a useful concept to adopt to ensure proper spatial averaging is provided, but does not necessarily imply the processing of image elements in separate, individual groups. The image elements can be processed without reference to any grouping, but with an appropriate global pattern of modification to ensure correct local spatial averaging (for example, as shown in FIGS. 11(A) to 11(C)).

Figure 12:
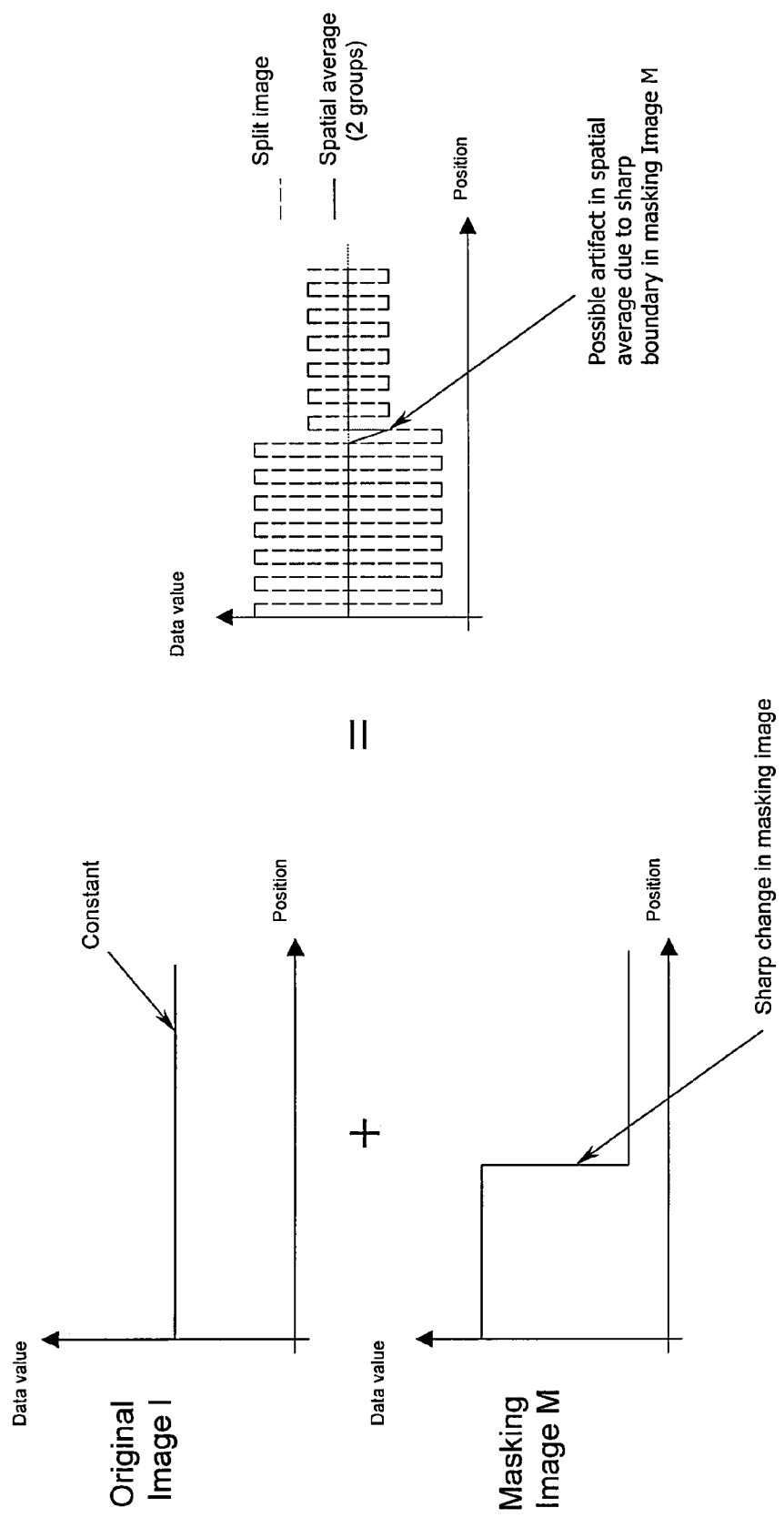
FIG. 12 illustrates a possible effect of a sharp change in masking image in the second embodiment.

The masking image should preferably have smoothly-varying data values, since any abrupt changes may have a minor effect on the perceived image on-axis in certain circumstances. FIG. 12 illustrates why an abrupt change in the masking image could leave an artifact in the perceived image. This can be counteracted with suitable modification to a method used in the second embodiment, for example a pre-processing stage to alter the masking image to avoid or reduce such an effect, or a change to the algorithm used to combine the masking image to prevent or reduce such an effect.

In summary, a display device according to the second embodiment comprises a liquid crystal display panel for displaying an image by spatial light modulation, and circuitry for switching liquid crystal in the panel between having a first configuration in a first (public) mode to cause an image displayed using the panel to be discernible from a wide range of viewing angles, and having a second configuration in a second (private) mode to cause an image displayed using the panel to be discernible substantially only from within a narrow range of viewing angles. The second configuration of liquid crystal is such as to cause an image-confusing pattern to be visible in the image discerned by a viewer outside the narrow range of angles. The liquid crystal in the first configuration comprises a plurality of lateral regions each having one of at least two different arrangements of liquid crystal. The first configuration regions are sized so as not to be resolvable by a viewer. The liquid crystal in the second configuration may comprise a plurality of lateral regions each having one of at least two different arrangements of liquid crystal or may comprise a single region. The liquid crystal in the second configuration is arranged to provide the display panel with a substantially linear data value-to-luminance response for viewing angles within the narrow range and a substantially non-linear data value-to-luminance response for viewing angles outside the narrow range. The first configuration regions are adapted such that light travelling at an angle outside the narrow range of angles passes through at least two regions having different arrangements of liquid crystal so as to have a substantially linear data value-to-luminance response. The second configuration regions are adapted such that light travelling at an angle outside the narrow range of angles has a substantially non-linear data value-to-luminance response.

As described above, in the first example of the second embodiment of the present invention, neighbouring data values are modified to produce an image that, when viewed through a linear display device (on-axis) will be spatially averaged by the human eye back to the original image, but when viewed through a non-linear display device (off-axis) will introduce a component of the degree of splitting used. If the degree of splitting is varied across the image by an amount proportional to a second image, then when viewed off-axis the original and the second image will both be visible. The second image is the masking image M described above. If the masking M has a confusing patterning such as a chequerboard or company logo, then the original image will be substantially hidden to an off-axis viewer. This provides a private mode of operation, in which only the on-axis viewer has an undisturbed view of the original image.

The second embodiment of the present invention provides an electronically-switchable method for producing viewing angle restriction. A custom masking image can be used, which may be a moving image in order to provide enhanced confusion to unauthorised viewers. The second embodiment does not require shuttered glasses as do some known techniques, and can be applied to the whole or part of the display. Privacy can be produced in both horizontal and vertical directions if there is non-linearity in both planes. The privacy level and area can be dependent on the content being displayed, and variable view-angle restrictions can be provided by changing the degree of splitting used. An embodiment of the present invention provides a low cost, switchable system for producing switching view-angle restriction.

The image processing parts of the second embodiment can be implemented in hardware, or in software, or a combination. An operating program for implementing the second embodiment can be stored on a computer-readable medium, although an operating program embodying the present invention need not be stored on a computer-readable medium and could, for example, be embodied in a signal such as a downloadable data signal provided from an Internet website. The appended claims are to be interpreted as covering an operating program by itself, or as a record on a carrier, or as a signal, or in any other form.

It will be appreciated that the image processing technique of the second embodiment can be used in combination with any of the other embodiments described herein to enhance the effectiveness of the private mode. In this respect, the display panels used in each of the embodiments described herein will, at least to some extent, exhibit the non-linear characteristics required for the image processing technique to provide at least some additional benefit in the private mode.

Figure 13:
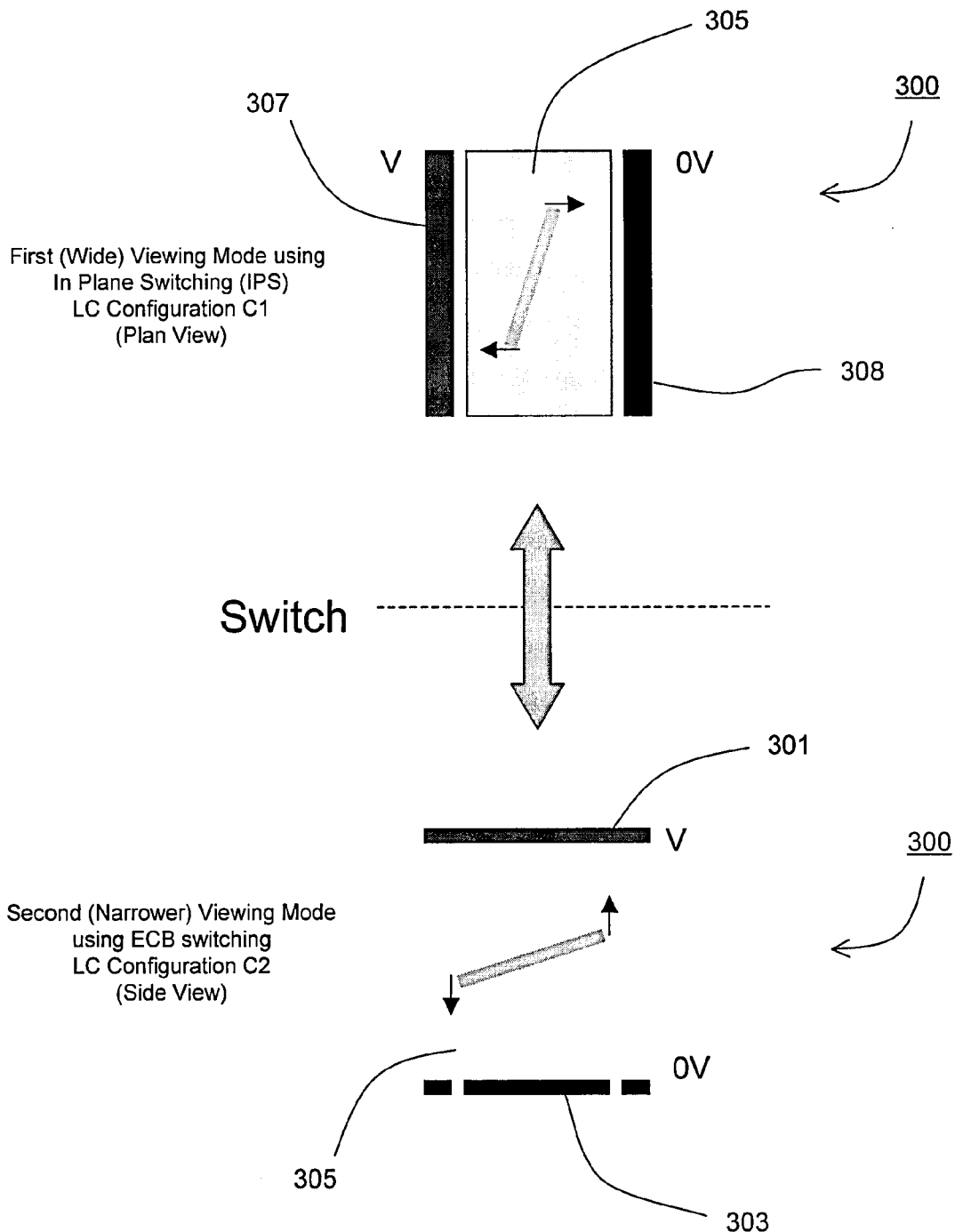
FIG. 13 shows plan and side views of a display panel according to a third embodiment of the present invention showing operation in wide and narrow viewing modes respectively.

FIG. 13 illustrates a display device incorporating a liquid crystal display panel 300 according to a third embodiment of the present invention. In the third embodiment the first (wide) mode of the liquid crystal display is provided by switching a liquid crystal layer 305 with an electric field substantially parallel to the layer a using a first set of (in-plane) electrodes 307, 308. This in-plane switching (IPS) is known to give a wide viewing angle. The liquid crystal configuration C1 in the first (wide) mode of operation is illustrated in the top portion of FIG. 13, which is a plan view of one liquid crystal in-plane switching cell.

The second (narrow) mode of operation is provided by switching the liquid crystal layer 305 with an electric field applied across the liquid crystal layer (electrically controlled birefringent or ECB switching) using a second set of electrodes 301, 303. The switching of the liquid crystal layer 305 out of the plane of the layer gives a narrow viewing angle. The liquid crystal configuration C2 in the second (narrow) mode of operation is illustrated in the bottom portion of FIG. 13, which is a side view of one liquid crystal ECB switching cell.

Figure 17:
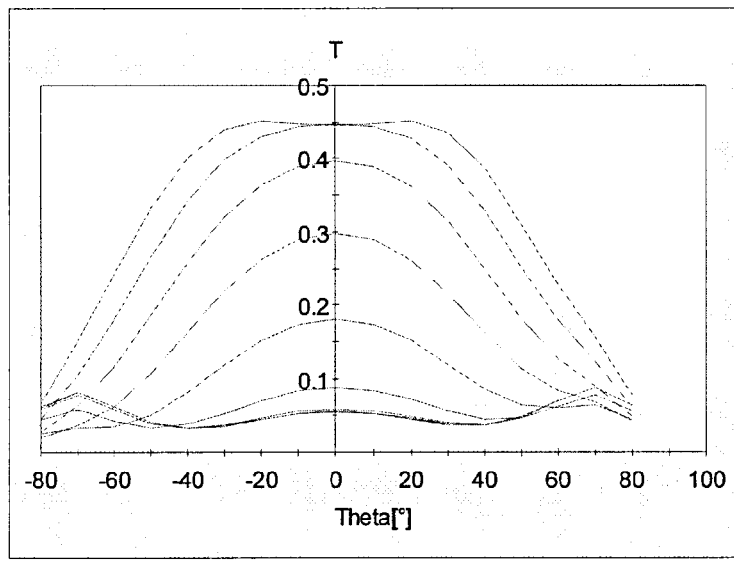
FIGS. 17(A) and 17(B) show the viewing angle dependency respectively for two voltage ranges used in the fourth embodiment.
Figure 17:
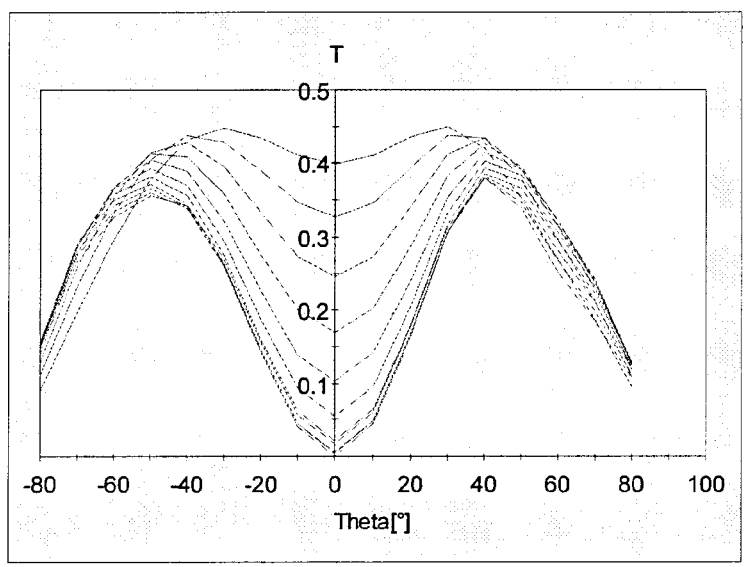

Alternatively, the first (wide) and second (narrow) viewing modes can be provided in an embodiment of the present invention by driving a liquid crystal display panel in two different respective voltage ranges. An example of a suitable such device is shown in FIG. 15, with associated viewing angle characteristics shown in FIG. 17.

A fourth embodiment will be described with reference to FIGS. 14(A) to 17. In this embodiment, switchable privacy is achieved using an LC mode which has two voltage ranges, denoted in FIGS. 14(A) and 14(B) as ranges A and B, with similar greyscale variation on axis but a single voltage range, denoted as A in FIGS. 14(A) and 14(B), with normal greyscale variation off axis. In the public mode, the voltage range A having normal greyscale variation both on axis (FIG. 14(A)) and off axis (FIG. 14(B)) is used and good image quality is seen at all viewing angles. In the private mode, some of the pixels achieve the desired greyscale on axis (FIG. 14(A)) using the first voltage range A and other pixels achieve the same greyscale on axis (FIG. 14(A)) using the second voltage range B. Pixels that use the first voltage range A will appear normal both on and off axis (see pixels in the example image on the right-hand side of FIGS. 14(A) and 14(B) respectively that are linked by an arrow to voltage range A). However, pixels that use the second voltage range B will not appear normal off axis (see pixels in the example image on the right-hand side of FIG. 14(B) that are linked by an arrow to voltage range B). By patterning the pixels that use the first and second voltage ranges A and B, a confusing image will appear off axis (see the example image on the right-hand side of FIG. 14(B)).

An example of such a greyscale response is shown in FIGS. 14(A) and 14(B). For each greylevel on axis (FIG. 14(A)), there are two voltages that can be used. However, these two voltages do not give the same greylevels off axis (FIG. 14(B)). By patterning the pixels which use the first and second voltage ranges A and B a confusing image will be seen off axis (FIG. 14(B)). The pattern is not seen on axis (FIG. 14(A)) because the two voltage ranges A and B are matched to the same greylevels for this viewing angle.

Figure 16:
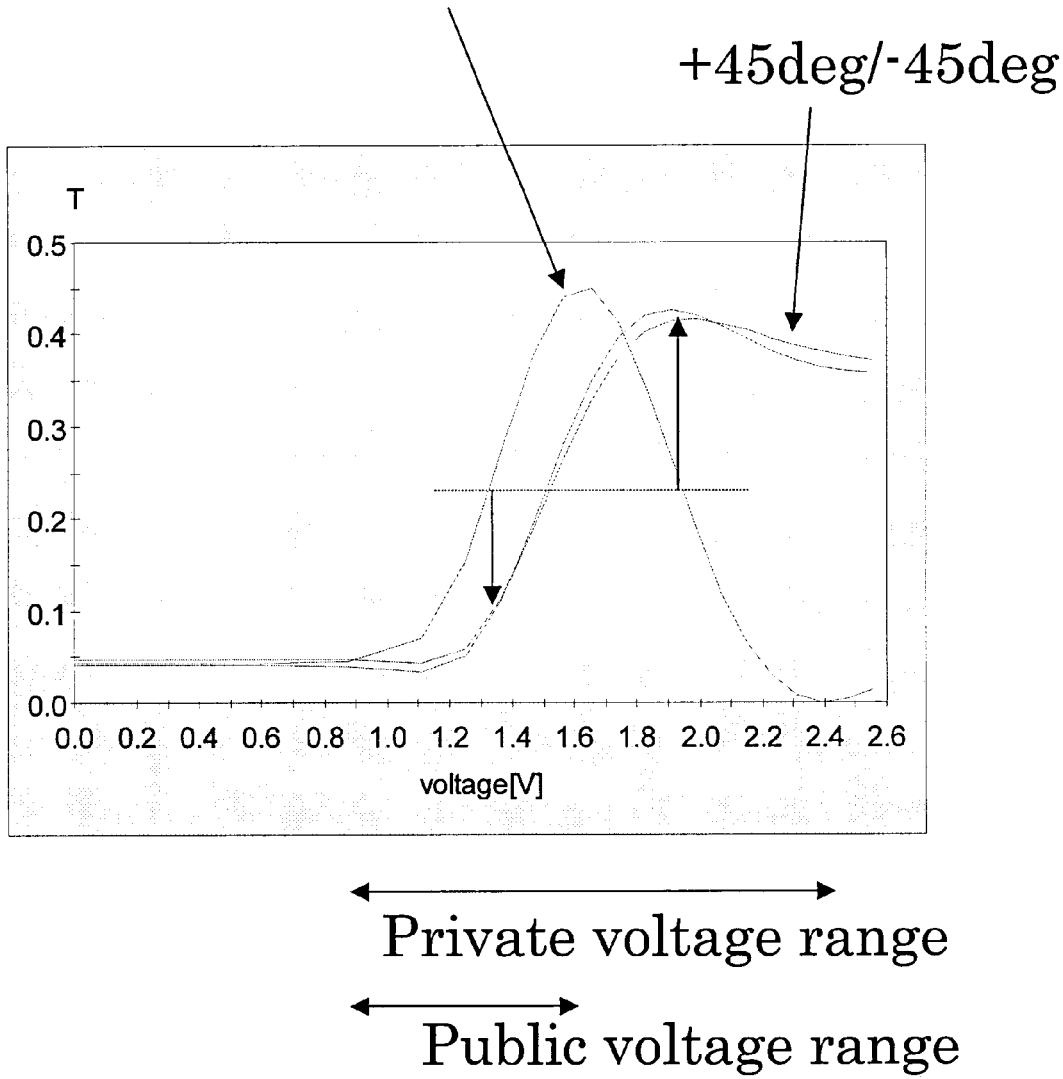
FIG. 16 is a graph showing greyscale responses on-axis and off-axis for the display panel of FIG. 15.

An example of a liquid crystal mode that can achieve this is shown in FIG. 15, and would be readily understood by the skilled person. FIG. 16 shows that, for the first voltage range of ~0.9V to 1.6V, the greyscale curve on axis is similar to the greyscale curve off axis (+/−45 deg). However, for the second voltage range of ~1.6V to 2.4V, the greyscale curve is inverted but similar in range on axis but is virtually unchanged off axis. Therefore two voltages can be selected to give identical greylevels on axis but these voltages will give very different greylevels off axis. FIGS. 17(A) and 17(B) show the viewing angle dependency of the greylevels for the two voltage ranges. Only the low voltage range is used for the public mode, while a pattern of low and high voltage ranges is used for the private mode; by matching greylevels on axis the pattern will only be seen off axis.

Therefore, in the fourth embodiment, two voltage ranges are used to achieve similar greylevels on axis, one of these voltage ranges giving normal greyscale variation off axis and the other giving abnormal greyscale off axis. Driving the panel only in voltage the first voltage range gives good viewing at all angles. Driving the panel in the second voltage range gives abnormal viewing off axis. Privacy can be enhanced by patterning the pixels which use first and second voltage ranges such that the abnormal viewing off axis results in a pattern which confuses the image seen by the off axis viewer.

A fifth embodiment of the present invention will now be described with reference to FIGS. 18(A) and 18(B). In the fifth embodiment, the number or characteristics of the liquid crystal orientations in the second configuration (private mode) are modified with respect to the first configuration (public mode), such that the image displayed in the second configuration (private mode) is visible over a narrower range of viewing angles than in the first configuration (public mode). The switching of the number or orientation of the liquid crystal regions is achieved by use of an in-plane electric field.

The liquid crystal mode employed is the Continuous Pinwheel Aligned (CPA) mode. In this mode, the liquid crystal molecules are vertically aligned when no voltage is applied. When a substantially uniform electric field is applied, the presence of a 'rivet' protrusion on the electrode surface, along with the fringing fields at the edge of the pixel, results in pairs of liquid crystal orientations tilted symmetrically on opposite sides of the protrusion. These pairs of orientations are arranged in a continuous 'pinwheel' structure when viewed from the normal to the liquid crystal layer. The average of the continuous pinwheel liquid crystal orientations provides an inherently wide viewing angle in all azimuthal directions. This first configuration is shown in FIG. 18(A). The electrode is segmented, as described below, but substantially the same voltage is applied to each segment of the electrode to achieve a substantially uniform electric field.

A second (narrow) viewing angle configuration is provided by patterning the electrode and applying different voltages to different electrode segments, as shown in FIG. 18(B). The patterned electrode produces additional electric fields substantially within the plane of the liquid crystal layer. These in-plane fields overcome the effect of the protrusion on the liquid crystal orientations and reduce the number of orientations; in the example depicted in FIG. 18(B) the number of orientations is reduced to two. The average of the resulting two liquid crystal orientations will have a wide viewing angle for certain azimuthal directions and a narrower viewing angle for other azimuthal directions.

Therefore, in the first (wide) viewing angle configuration the patterned electrodes are set to substantially the same voltage within a given pixel, and the protrusion produces continuous pinwheel liquid crystal orientations. In the second (narrow) viewing angle configuration, a voltage is applied between adjacent in-plane electrodes to modify the number or characteristics of the liquid crystal orientations.

The orientation of the in-plane electrode segments can be arranged in regions on a scale large enough to be visible to a viewer. For a particular azimuthal direction, some of these regions will have wide viewing angle and some a narrow viewing angle. Therefore an off-axis viewer will see the different regions as a pattern of different brightness. This image confusion pattern will obscure the underlying image.

It is advantageous if the patterned in-plane electrode segments form the ground electrode for the pixel, rather than the thin film transistor (TFT) electrode. In this case, an incremental voltage negative $\Delta V$ can be applied to half of the in-plane electrodes and positive $\Delta V$ can be applied to the other half. This incremental voltage generates an in-plane field, but leaves the average voltage of the electrode on one side of the liquid crystal layer at zero volts (ground). A single incremental voltage $\Delta V$ can be applied to all the in-plane electrodes across the whole panel to switch from the first (wide) viewing angle configuration to the second (narrow) viewing angle configuration. No extra TFTs are required at the pixels to switch between configurations.

The pitch of the in-plane electrode segments required to modify the number or characteristics of the liquid crystal orientations will vary according to the liquid crystal mode. The pitch can be varied from being substantially equal to the thickness of the liquid crystal layer to a pitch such that there are only two in-plane electrode segments per pixel. In the case of two in-plane electrode segments per pixel, these may be located at the edges of the pixel, and may be located outside the light-transmitting aperture of the pixel. Generally, the stronger the tendency to form the first liquid crystal configuration the greater the number of electrode segments per pixel would be required to switch adequately to the second liquid crystal configuration.

Figure 19:
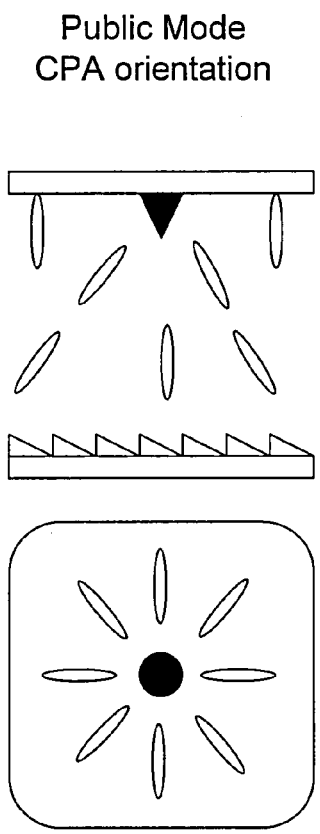
FIGS. 19(A) and 19(B) illustrate a sixth embodiment of the present invention.
Figure 19:
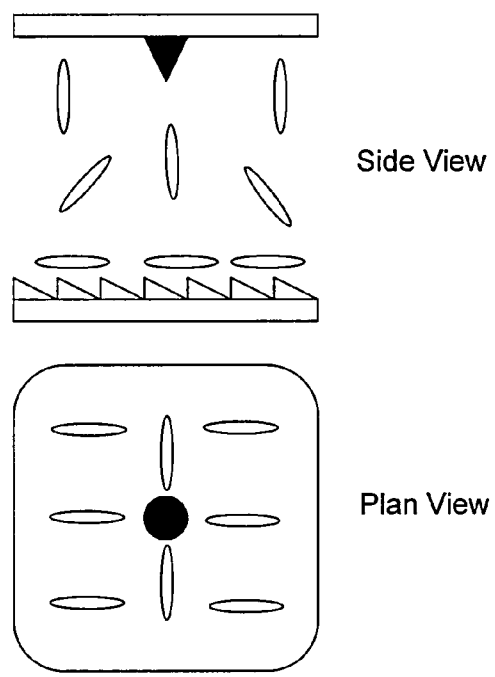
Figure 20:
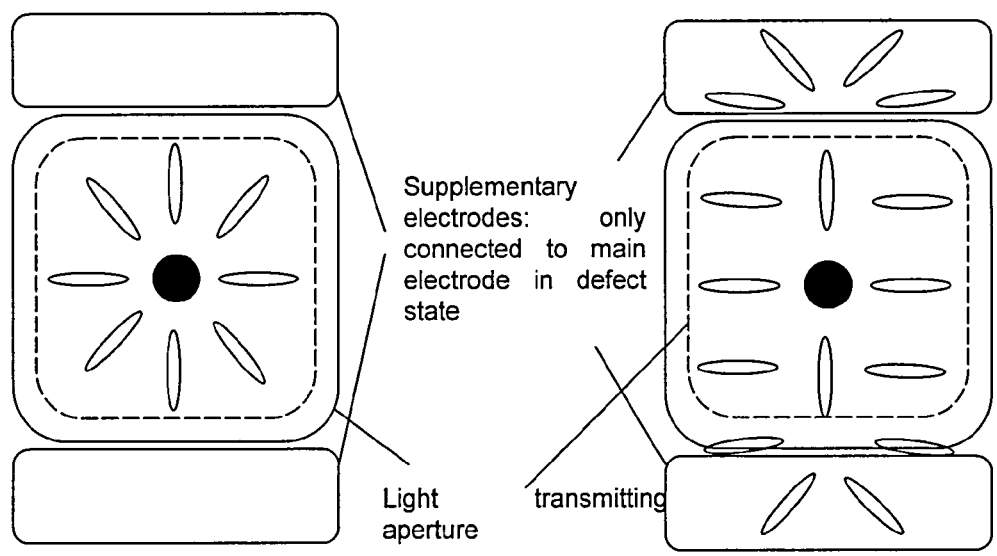
FIG. 20 illustrates the use of supplementary electrodes in the sixth embodiment.

A sixth embodiment of the present invention will now be described with reference to FIGS. 19(A), 19(B) and 20. In this embodiment, an alignment layer consisting of periodic microstructures is used to enable switching between a first configuration having a wide range of viewing angles and a second configuration having a narrow range of viewing angles.

One type of grating aligned nematic liquid crystal cells have a surface which, due to periodic micro-structures, is switchable between a continuous liquid crystal director structure, which is approximately homeotropic, and a "defect" structure, which is approximately planar aligned. These states are bistable and switching between the two is achieved by a DC field pulse coupling flexoelectrically to the splay and bend regions of the director field. Such a surface used in a continuous pinwheel aligned (CPA) liquid crystal allows switching in this embodiment between the usual homeotropic aligned VAN structure, in which an applied high frequency field causes a radial director distribution about the centre of the pixel, and a hybrid aligned nematic (HAN) like structure in which this radial distribution is disrupted by the preferential alignment direction caused by the grating. These are shown respectively in FIGS. 19(A) and 19(B).

As the switching from continuous to defect state requires a DC pulse, the usual AC applied field used in an ASV pixel will still be usable to provide greylevel control. The radial director in the continuous state provides an inherently wide viewing angle to all azimuths, whereas the two "HAN like" liquid crystal orientations will have a wide viewing angle for certain azimuthal directions and a narrower viewing angle for other azimuthal directions. The orientation of the periodic microstructures can be patterned in regions on a scale large enough to be visible to a viewer. For a particular azimuthal direction some of these regions will have wide viewing angle and some a narrow viewing angle. Therefore an off-axis viewer will see the different regions as a pattern of different brightness. This image confusion pattern will obscure the underlying image.

The fringing fields at the edge of the pixel, which, along with the "rivet" protrusion in the centre, promote the radial director distribution, will still be in effect in the defect state. This may hinder the switch to the more linear director alignment in the defect state. For this reason, the electrode area on the lower substrate of the cell could be expanded beyond the light-transmitting aperture of the pixel to remove these fringe field effects from the visible region. This could be done by having supplementary electrode regions which would only be switched on when the display was in the defect state to assist restriction of the viewing angle; this is shown in FIG. 20.

Figure 21:
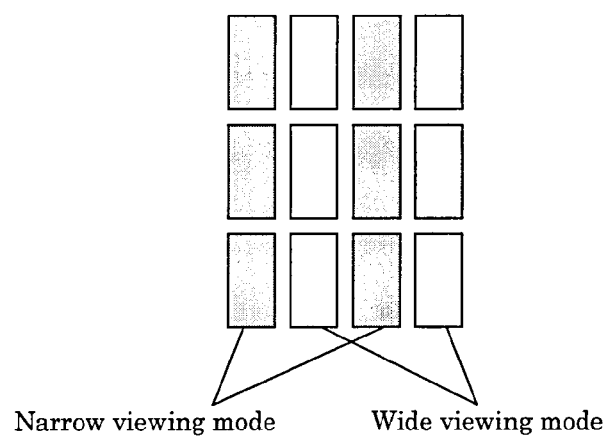
FIG. 21 illustrates a seventh embodiment of the present invention.

A seventh embodiment of the present invention will now be described with reference to FIG. 21. In the seventh embodiment, the display is composed of pixels that are each subdivided into a part having a narrow viewing angle LC mode and a part having a wide viewing angle LC mode. The two different LC mode parts may be arranged in separate columns (as shown in FIG. 21) or patterned in some other way (a chequerboard pattern, for example). One of the LC modes has an intrinsic wide viewing angle characteristic and the other mode has an intrinsic narrow viewing angle characteristic. An example of a wide viewing angle mode is the in-plane switching (IPS) mode and an example of a narrow viewing angle mode is the electrically controlled birefringence (ECB) mode, so that the seventh embodiment can be considered to be similar to the third embodiment described above (and accordingly only the main differences between the third and seventh embodiments are described here). Where the wide and narrow LC modes are arranged in alternating columns as shown in FIG. 21, for each pixel there is a wide and narrow viewing angle sub-pixel.

In the public mode, the display panel may be operated so that only the pixels having a wide viewing angle LC mode operate. Alternatively, both the wide and narrow viewing mode pixels may operate simultaneously, so the on-axis user receives the advantage of an image with twice the brightness or spatial resolution. In the private mode, the display panel may be operated so that only the pixels having a narrow viewing angle LC mode operate. Alternatively, a privacy pattern can be realised by operating the narrow viewing angle LC mode pixels in some regions and the wide viewing angle LC mode pixels in other regions. An off-axis viewer will see the different regions as a pattern of different brightness. This image confusion pattern will obscure the underlying image.

An eighth embodiment of the present invention will now be described with reference to FIGS. 22 to 25. The eighth embodiment, similar to the fourth embodiment described above, employs two different voltage ranges to achieve similar greylevels on-axis but differing greylevels off axis.

For a continuous pinwheel alignment (CPA) mode liquid crystal display (LCD), the radially distributed director structure is induced by both a protruding "rivet" on the upper cell surface in the centre of the pixel, and fringing fields from the edge of the square electrode area on the lower substrate. The lower substrate contains the thin film transistor (TFT) array, and the upper substrate has the common ground electrode.

Figure 22:
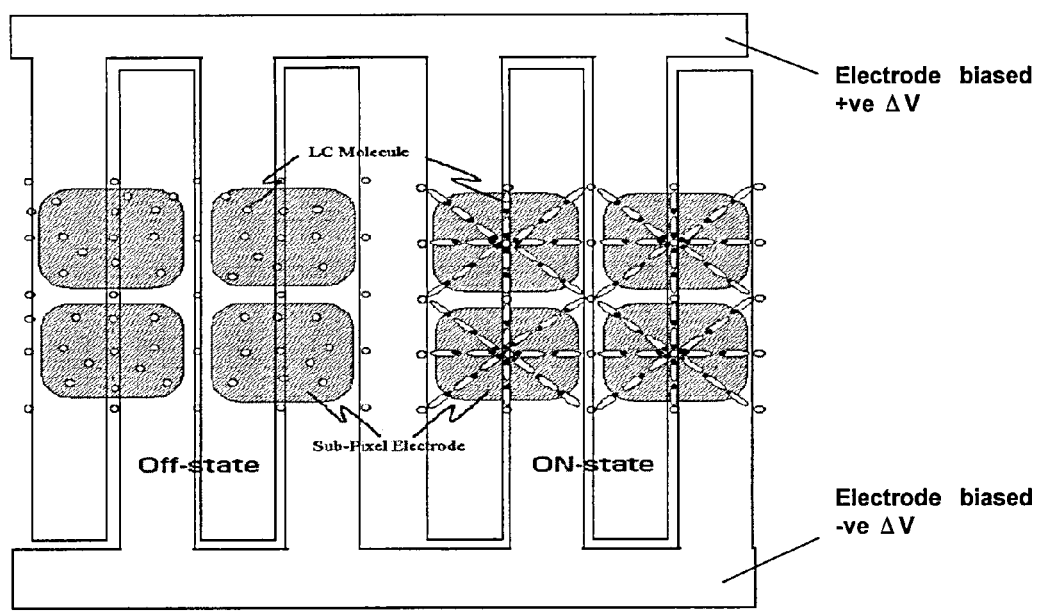
FIG. 22 illustrates an eighth embodiment of the present invention.
Figure 23:
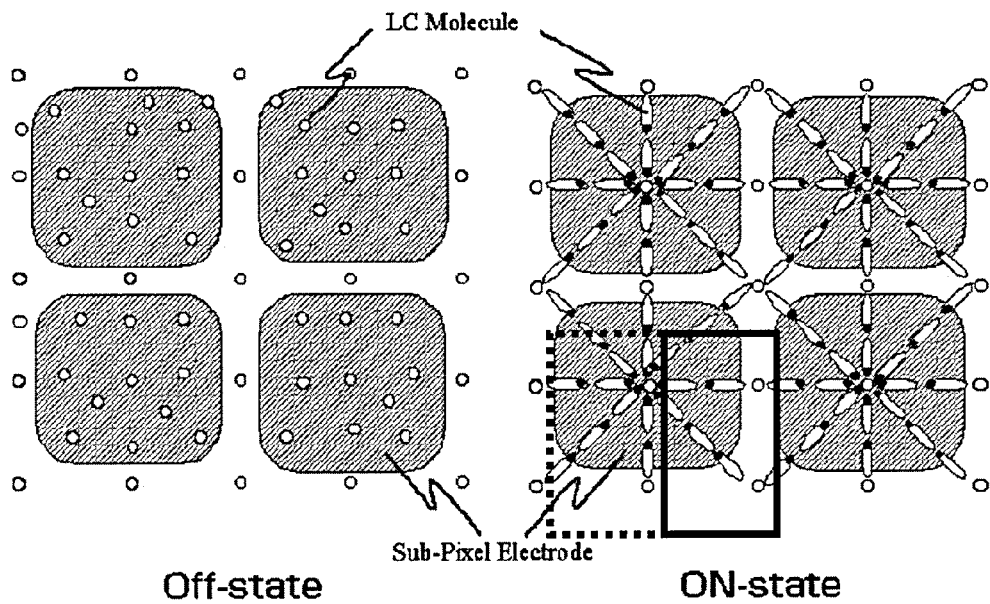
FIG. 23(A) to 23(C) illustrates operation of the eighth embodiment.
Figure 23:
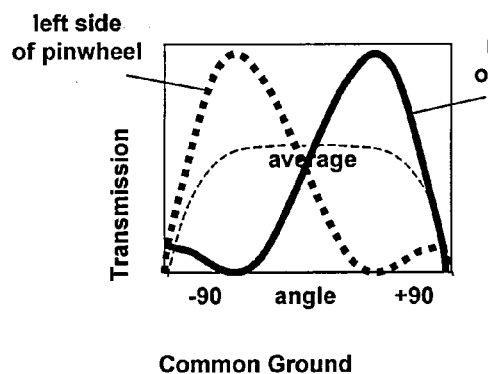
Figure 23:
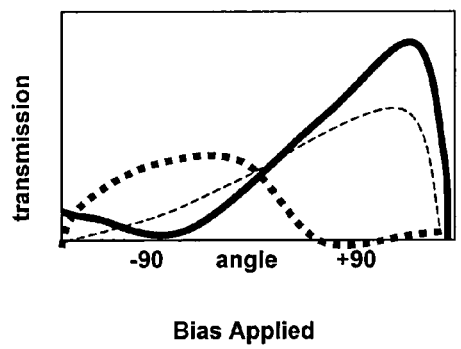

In the eighth embodiment, this common ground electrode is divided into two interdigitated electrodes, each covering one side of every sub-pixel pinwheel domain, as is illustrated in FIG. 22 in plan view. An equal but opposite bias voltage is applied to each side of the sub pixel, i.e. the driving voltage applied to every pixel to display an image is altered by $+\Delta V$ for one half of the sub-pixel and $-\Delta V$ for the other half. An advantage of patterning the ground electrode in this way is that a single bias voltage $\Delta V$ can be applied to all the electrodes across the whole panel. Also, no extra TFTs are required at the pixels.

Due to the largely linear greylevel (voltage-luminance) curve observed from a CPA pixel on-axis as shown in FIG. 23(A), the respective increases and decreases in drive voltage produce a luminance which averages out substantially to the original luminance that would be observed with a common ground electrode at 0V, so that very little change occurs and the perceived image remains unaltered.

To the off-axis viewer, however, the resulting luminance depends greatly on whether the viewer is positioned to the side of the subpixel which has the increased electric field, or to the side of the subpixel having the decreased electric field. This asymmetry in the voltage response is illustrated in FIGS. 23(B) and 23(C), and is due to the liquid crystal director tilting towards or away from the viewer.

Figure 24:
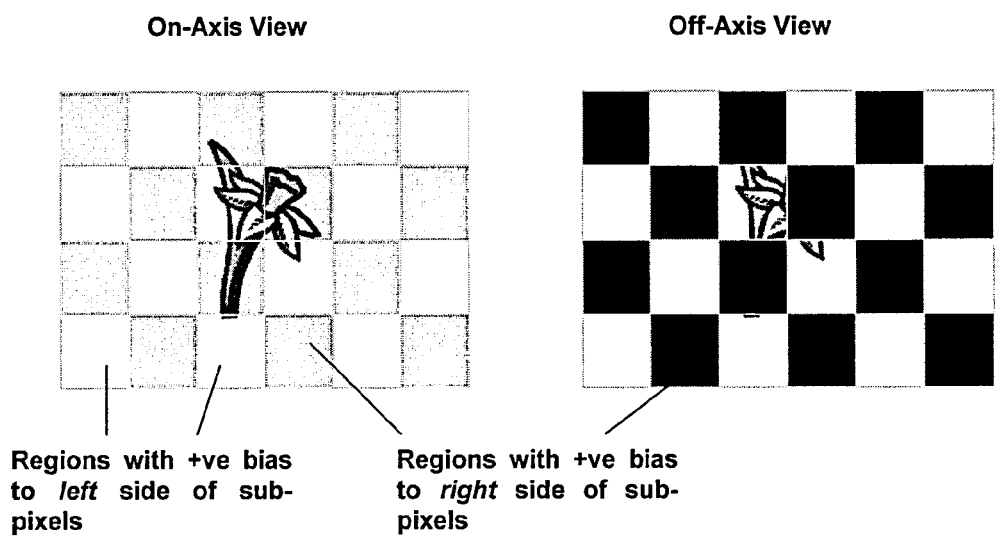
FIG. 24 illustrates a staggered arrangement of patterned electrodes in the eighth embodiment.
Figure 25:
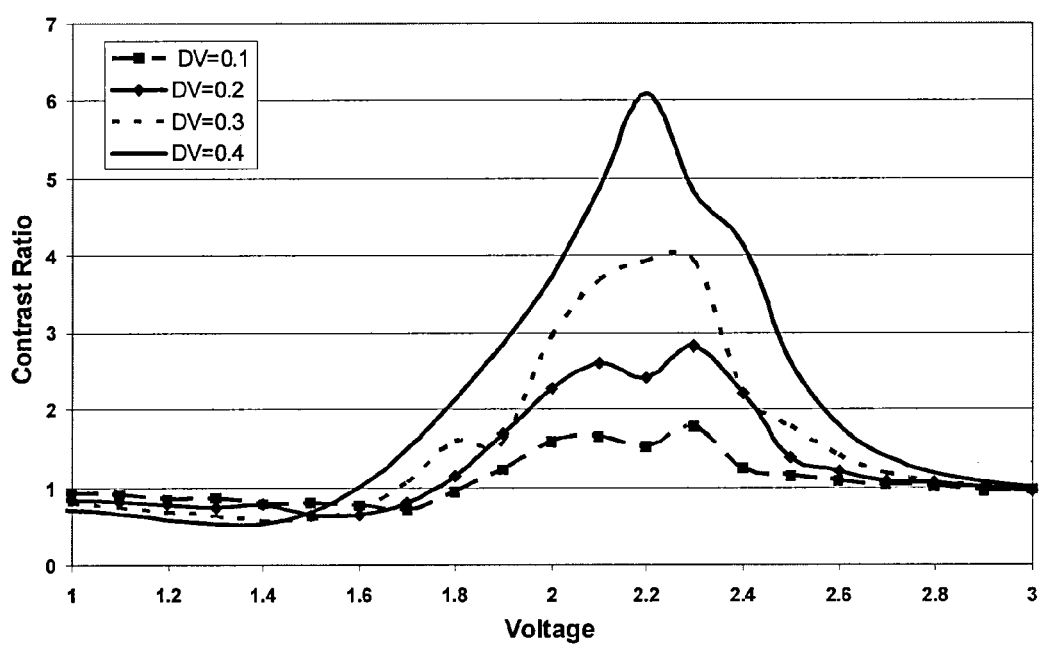
FIG. 25 illustrates the difference in luminance seen off axis in the eighth embodiment.

The applied bias will therefore cause the display to appear brighter from one side than the other. If the interdigitated electrodes are staggered, so that some portions of the display are made to appear brighter to the left side and darker to the right, and the remaining regions have the opposite effect, an image confusion pattern can be generated for viewers on either side, and the information on the display is concealed to anyone but the on-axis viewer. One possible staggering arrangement for the interdigitated counter electrode is shown in FIG. 24.

The difference in luminance between a sub-pixel biased to the left and a sub-pixel biased to the right, for a viewer one side of the display, determines the strength of this confusion pattern. This has been calculated for a CPA type pixel between achromatic circular polarisers, as used in mobile phone LCDs, for a range of +/−bias voltages, and has been found to have the dependence on the initial (unbiased) greylevel voltage shown in FIG. 25. This shows that the best privacy would be obtained for pixel display a mid-brightness image.

It will be appreciated that each of the above-described embodiments is not limited to operation using the particular liquid crystal configurations described. Each embodiment of the present invention can be used with any of the following types of liquid crystal display: two or four domain Twisted Nematic (TN) or Super Twisted Nematic (STN); two or four domain Vertically Aligned Nematic (VAN) and Twisted Vertically Aligned Nematic (TVAN); two or four domain Hybrid Aligned Nematic (HAN); Multidomain Vertical Aligned (MVA); and Continuous Pinwheel Aligned (CPA). In addition liquid crystal modes that have intrinsic bistability, such as Bistable Twisted Nematic (BTN), Bistable Hybrid Aligned Nematic (BHAN), Zenthally Bistable Nematic (ZBN) and azimuthally bistable modes produced by gratings or other surface structures can be employed. Other suitable liquid crystal modes would be readily available to those skilled in the art.

An embodiment of the present invention can be applied to any type of display device, for example those on mobile phones, Personal Digital Assistants (PDA), Electronic Point of Sale (EPoS) kiosks, laptop computers or desktop monitors.

The invention claimed is:

1. A display device comprising:
   a liquid crystal display panel with pixels for displaying an image by spatial light modulation,
   first and second sets of regions in the liquid crystal display panel, and
   circuitry being adapted to apply an electric field in first and second different ways in the first and second sets of regions respectively,
   wherein the first sets of regions cause the image to be discernible from a wide range of viewing angles and the second sets of regions cause the image to be discernible substantially only from within a narrow range of viewing angles, and
   the circuitry is adapted to operate the display panel using different respective directions of applied electric field relative to a plane of the liquid crystal layer in the first and second sets of regions.

2. A display device as claimed in claim 1, wherein
   the circuitry switches liquid crystal in the panel between a first mode to cause the image displayed using the panel to be discernible from the wide range of viewing angles, and
   a second mode to cause the image displayed using the panel to be discernible substantially only from within the narrow range of viewing angles.

3. A display device as claimed in claim 2, wherein in the second mode the second sets of regions cause an image-confusing pattern to be visible in the image discerned by a viewer outside the narrow range of viewing angles.

4. A display device as claimed in claim 3, wherein the image-confusing pattern is at least one of a chequer board pattern or a pattern of text or a logo.

5. A display device as claimed in claim 2, wherein the first regions and the second regions are operated in the second mode.

6. A display device as claimed in claim 2, wherein
   the circuitry is operable in the second mode to operate some pixels in both the first way and the second way.

7. A display device as claimed in claim 1, wherein each pixel comprises at least a sub-pixel in the first sets of regions and at least a sub-pixel in the second sets of regions.

8. A display device as claimed in claim 1, wherein the circuitry is adapted to operate the display panel using different respective ranges of applied electric field strengths in the first and second sets of regions.

9. A display device as claimed in claim 1, wherein the first and second regions are vertically aligned nematic regions.

10. A display device as claimed in claim 1, wherein the circuitry is adapted to operate the display panel using in-plane switching in the first sets of regions in the first way and electrically controlled birefringence switching in the second sets of regions in the second way.

11. A display device as claimed in claim 10, wherein the circuitry comprises a first set of electrodes for performing the in-plane switching and a second set of electrodes for performing the electrically controlled birefringence switching.

12. A display device as claimed in claim 11, wherein the first set of electrodes is disposed on the same side of the display panel to apply a field substantially in the plane of the display panel.

13. A display device as claimed in claim 11, wherein the second set of electrodes is disposed on opposite sides of the display panel to apply a field across the panel.

14. A display device comprising
   a liquid crystal display panel with pixels for displaying an image by spatial light modulation,
   first and second regions in the liquid crystal display panel,
   first sets of electrodes in the first regions, and
   second sets of electrodes in the second regions, wherein,
   the first sets of electrodes provide a first electric field to cause the image to be discernible from a wide range of viewing angles, and
   the second sets of electrodes provide a second electric field to cause the image to be discernible substantially only from within a narrow range of viewing angles, and
   the first sets of electrodes and second sets of electrodes are adapted to operate the display panel using different respective directions of applied electric field relative to a plane of the liquid crystal layer in the first and second sets of regions.

15. A display device as claimed in claim 14, wherein
   the first electric field is provided substantially parallel to a liquid crystal layer of the liquid crystal display panel, and
   the second electric field is provided substantially across the liquid crystal layer.

16. A display device as claimed in claim 14, wherein
   the first sets of electrodes is adapted to operate the liquid crystal display panel using in-plane switching in the first regions, and
   the second sets of electrodes is adapted to operate the liquid crystal display panel electrically controlled birefringence switching in the second regions.

17. A display device as claimed in claim 14, wherein the first electric field and the second electric field are provided in two different respective voltage ranges.

18. A display device as claimed in claim 14, wherein
   each pixel comprises at least a sub-pixel in the first regions and at least a sub-pixel in the second regions.

19. A display device as claimed in claim 14, wherein the display device further comprises:
   a circuitry for switching liquid crystal in the panel between a first mode to cause the image displayed using the panel to be discernible from a wide range of viewing angles, and
   a second mode to cause the image displayed using the panel to be discernible substantially only from within a narrow range of viewing angles.

20. A display device as claimed in claim 19, wherein only the first regions are operated in the first mode.

21. A display device as claimed in claim 19, wherein the first regions and the second regions are operated in the second mode.

22. A display device as claimed in claim 19, wherein in the second mode the second regions cause an image-confusing pattern to be visible in the image discerned by a viewer outside the narrow range of viewing angles.

* * * * *